(12) United States Patent
Morishita

(10) Patent No.: US 10,537,793 B2
(45) Date of Patent: Jan. 21, 2020

(54) SERVER DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 50 days.

(21) Appl. No.: 15/841,584

(22) Filed: Dec. 14, 2017

(65) Prior Publication Data

US 2019/0015741 A1 Jan. 17, 2019

Related U.S. Application Data

(63) Continuation of application No. PCT/JP2017/025672, filed on Jul. 14, 2017.

(51) Int. Cl.
*A63F 13/20* (2014.01)
*A63F 13/216* (2014.01)
(Continued)

(52) U.S. Cl.
CPC .......... *A63F 13/216* (2014.09); *A63F 13/332* (2014.09); *H04L 67/1061* (2013.01); *H04L 67/18* (2013.01); *H04W 4/025* (2013.01)

(58) Field of Classification Search
CPC .............................. A63F 13/216; A63F 13/332
(Continued)

(56) References Cited

U.S. PATENT DOCUMENTS

2006/0046810 A1* 3/2006 Tabata .................... A63F 13/12
463/9
2007/0078003 A1* 4/2007 Sato ........................ A63F 13/10
463/43
(Continued)

FOREIGN PATENT DOCUMENTS

JP 2002-273034 A 9/2002
JP 2003-062353 A 3/2003
(Continued)

OTHER PUBLICATIONS

PS Vita Near Tip. Youtube.com. Online Mar. 5, 2012. Online. Accessed via the Internet. Accessed Feb. 1, 2019. <URL: https://www.youtube.com/watch?v=oJcIVcXBFxO> (Year: 2012) (Year: 2012).*

(Continued)

*Primary Examiner* — Omkar A Deodhar
*Assistant Examiner* — Shauna-Kay Hall
(74) *Attorney, Agent, or Firm* — Harness, Dickey & Pierce, P.L.C.

(57) ABSTRACT

A server device including: a communication interface configured to receive positional information with respect to a plurality of users including first and second users located in a real world, one of the plurality of users operating the terminal device; a memory configured to store a plurality of items and parameter values in association with user identification information of each user, the memory being configured to store computer-readable instructions, the plurality of items including first and second items, the user identification information including first and second user identification information for the first and second users; and a processor configured to execute the computer-readable instructions so as to assign the first item to the second user identification information of the second user switched from (Continued)

the first user and vary the parameter value of the first item based on the positional information of the second user.

14 Claims, 21 Drawing Sheets

(51) Int. Cl.
*H04L 29/08* (2006.01)
*A63F 13/332* (2014.01)
*H04W 4/02* (2018.01)

(58) Field of Classification Search
USPC .......................................................... 463/42
See application file for complete search history.

(56) References Cited

U.S. PATENT DOCUMENTS

| | | | | |
|---|---|---|---|---|
| 2007/0190494 | A1* | 8/2007 | Rosenberg | A63F 13/12 434/11 |
| 2011/0028220 | A1* | 2/2011 | Reiche, III | A63F 13/216 463/42 |
| 2012/0052953 | A1 | 3/2012 | Annambhotla et al. | |
| 2012/0309544 | A1* | 12/2012 | Kang | G07F 17/32 463/42 |
| 2013/0281123 | A1 | 10/2013 | Kuwahara | |
| 2013/0316819 | A1* | 11/2013 | Kinashi | A63F 13/12 463/31 |
| 2013/0331030 | A1* | 12/2013 | Nonaka | H04W 4/80 455/41.1 |
| 2013/0337906 | A1* | 12/2013 | Ikeda | A63F 13/69 463/29 |
| 2015/0072703 | A1 | 3/2015 | Mae et al. | |
| 2015/0271633 | A1 | 9/2015 | Yamane | |
| 2016/0346683 | A1* | 12/2016 | Worrall | A63F 13/26 |
| 2017/0001121 | A1* | 1/2017 | Shimoda | A63F 13/69 |

FOREIGN PATENT DOCUMENTS

| | | |
|---|---|---|
| JP | 2007-306984 A | 11/2007 |
| JP | 2012-000221 A | 1/2012 |
| JP | 2013-220246 A | 10/2013 |
| JP | 2013-252298 A | 12/2013 |
| JP | 2014-184096 A | 10/2014 |
| JP | 2015-052889 A | 3/2015 |
| JP | 2015-061631 A | 4/2015 |
| JP | 2015-181538 A | 10/2015 |
| JP | 2016-095859 A | 5/2016 |
| JP | 2016-189972 A | 11/2016 |

OTHER PUBLICATIONS

[New Release] New function to rear girls using GPS function?! Epochal idol game "AIPARA!"; [online], Jan. 16, 2015, <URL: https://app.famitsu.com/20150116_484235/>; 13 pages.

Japanese Office Action for Japanese Application No. 2017-538004, dated Mar. 5, 2019 (11 pages).

Pokémon Sun/Moon Official Guidebook Book 1, Complete Story Walkthrough, Overlap Inc., Dec. 14, 2016, 1st Edition, pp. 78 to 80, 109 to 110 (18 pages).

* cited by examiner

FIG. 5a

| USER ID | USER NAME | APPLICATION CURRENCY | CHARACTER | DESTINATION | POSITIONAL INFORMATION |
|---|---|---|---|---|---|
| U1 | A | 150 | C1 | U4 | (N1,E1) |
| U2 | B | 200 | C2 | - | (N2,E2) |
| U3 | C | 0 | C3 | - | (N3,E3) |
| U4 | D | 10 | C4 | - | (N4,E4) |
| U5 | E | 500 | C5 | - | (N5,E5) |
| ⋮ | ⋮ | ⋮ | ⋮ | ⋮ | ⋮ |

FIG. 5b

| CHARACTER ID | OFFENSIVE POWER | DEFENSIVE POWER | RECOVERY POWER | HIT POINT | NUMBER OF TIMES | TIME | TOTAL TIME | DISTANCE |
|---|---|---|---|---|---|---|---|---|
| C1 | 50 | 40 | 100 | 300 | 3 | T1 | P1 | 50km |
| C2 | 100 | 160 | 40 | 250 | - | - | - | - |
| C3 | 20 | 300 | 200 | 520 | - | - | - | - |
| C4 | 250 | 100 | 10 | 250 | - | - | - | - |
| C5 | 120 | 200 | 250 | 400 | - | - | - | - |
| ⋮ | ⋮ | ⋮ | ⋮ | ⋮ | ⋮ | ⋮ | ⋮ | ⋮ |

FIG. 12a

| USER ID | USER NAME | APPLICATION CURRENCY | CHARACTER | DESTINATION | POSITIONAL INFORMATION |
|---|---|---|---|---|---|
| U1 | A | 150 | C1 | - | (N1',E1') |
| U2 | B | 200 | C2 | - | (N2',E2') |
| U3 | C | 0 | C3 | - | (N3',E3') |
| U4 | D | 10 | C4 | - | (N4',E4') |
| U5 | E | 500 | C5 | - | (N5',E5') |
| ⋮ | ⋮ | ⋮ | ⋮ | ⋮ | ⋮ |

FIG. 12b

| CHARACTER ID | OFFENSIVE POWER | DEFENSIVE POWER | RECOVERY POWER | HIT POINT | NUMBER OF TIMES | TIME | TOTAL TIME | DISTANCE |
|---|---|---|---|---|---|---|---|---|
| C1 | 200 | 160 | 260 | 640 | - | - | - | - |
| C2 | 100 | 160 | 40 | 250 | - | - | - | - |
| C3 | 20 | 300 | 200 | 520 | - | - | - | - |
| C4 | 250 | 100 | 10 | 250 | - | - | - | - |
| C5 | 120 | 200 | 250 | 400 | - | - | - | - |
| ⋮ | ⋮ | ⋮ | ⋮ | ⋮ | ⋮ | ⋮ | ⋮ | ⋮ |

SERVER DEVICE, PROGRAM, AND METHOD

CROSS-REFERENCE TO RELATED APPLICATION

The present application is a continuation application of International Application No. PCT/JP2017/025672, filed on Jul. 14, 2017 which is expressly incorporated herein by reference in its entirety.

BACKGROUND

The present disclosure relates to a server device for executing an application that proceeds, using a predetermined item and a parameter value of the item, and a program and a method for executing the application.

Conventionally, server devices for executing an application using a predetermined item and a parameter value of the item are known.

For example, Japanese Patent Publication No. 2014-184096 describes a server device for executing a simulation soccer game application that causes a battle game by a plurality of characters to proceed on the basis of the characters and predetermined ability values of the characters.

SUMMARY

Therefore, in view of the above-described technology, the present disclosure provides a server device, a program, and a method for executing a new and highly enjoyable application using a predetermined item and a parameter value of the item according to various embodiments.

According to one aspect of the present disclosure, "a server device comprising: a memory configured to store one or a plurality of items and parameter values of the items in association with user identification information of each user, in addition to computer-readable instructions; a communication interface configured to receive positional information in a real world of a user from a terminal device held by the user; and a processor configured to execute the computer-readable instructions so as to: associate a first item with second user identification information of a second user different from a first user, the first item having been associated with first user identification information of the first user in the memory, and vary the parameter value of the first item on the basis of the positional information of the second user, the positional information being received by the communication interface after the first item is associated with the second user identification information" is provided.

According to one aspect of the present disclosure, "a computer program product embodying computer-readable instructions stored on a non-transitory computer readable medium for causing a computer to execute a process by a processor, the computer comprising: a memory configured to store one or a plurality of items and parameter values of the items in association with user identification information of each user; and a communication interface configured to receive positional information in a real world of a user from a terminal device held by the user, the computer configured to perform the steps of: associating a first item with second user identification information of a second user different from a first user, the first item having been associated with first user identification information of the first user in the memory, varying the parameter value of the first item on the basis of the positional information of the second user, the positional information being received by the communication interface after the first item is associated with the second user identification information" is provided.

According to one aspect of the present disclosure, "a method for causing a processor in a computer to execute a process, the method comprising executing on the processor based on the computer readable instructions the step of: storing one or a plurality of items and parameter values of the items in association with user identification information of each user, in addition to a predetermined instruction command; receiving positional information in a real world of a user from a terminal device held by the user; and associating a first item with second user identification information of a second user different from a first user, the first item having been associated with first user identification information of the first user in the memory, and varying the parameter value of the first item on the basis of the positional information of the second user, the positional information being received by the communication interface after the first item is associated with the second user identification information" is provided.

According to various embodiments of the present disclosure, a server device, a program, and a method for executing a new and highly enjoyable application using a predetermined item and a parameter value of the item can be provided.

Note that the above-described effect is simply an example provided for illustrative purposes only, and is not restrictive for convenience of description. Any effect described in the present disclosure or an apparent effect for a person skilled in the art can be exhibited in addition to or in place of the above-described effect.

BRIEF DESCRIPTION OF DRAWINGS

FIG. 5a is a diagram conceptually illustrating a user information table stored in the server device 200 according to the first embodiment of the present disclosure. Further, FIG. 5b is a diagram conceptually illustrating a character information table stored in the server device 200 according to the first embodiment of the present disclosure.

FIG. 12a is a diagram conceptually illustrating the user information table stored in the server device 200 according to the first embodiment of the present disclosure. Further, FIG. 12b is a diagram conceptually illustrating the character information table stored in the server device 200 according to the first embodiment of the present disclosure.

DESCRIPTION OF EXEMPLARY EMBODIMENTS

Figure 1A:
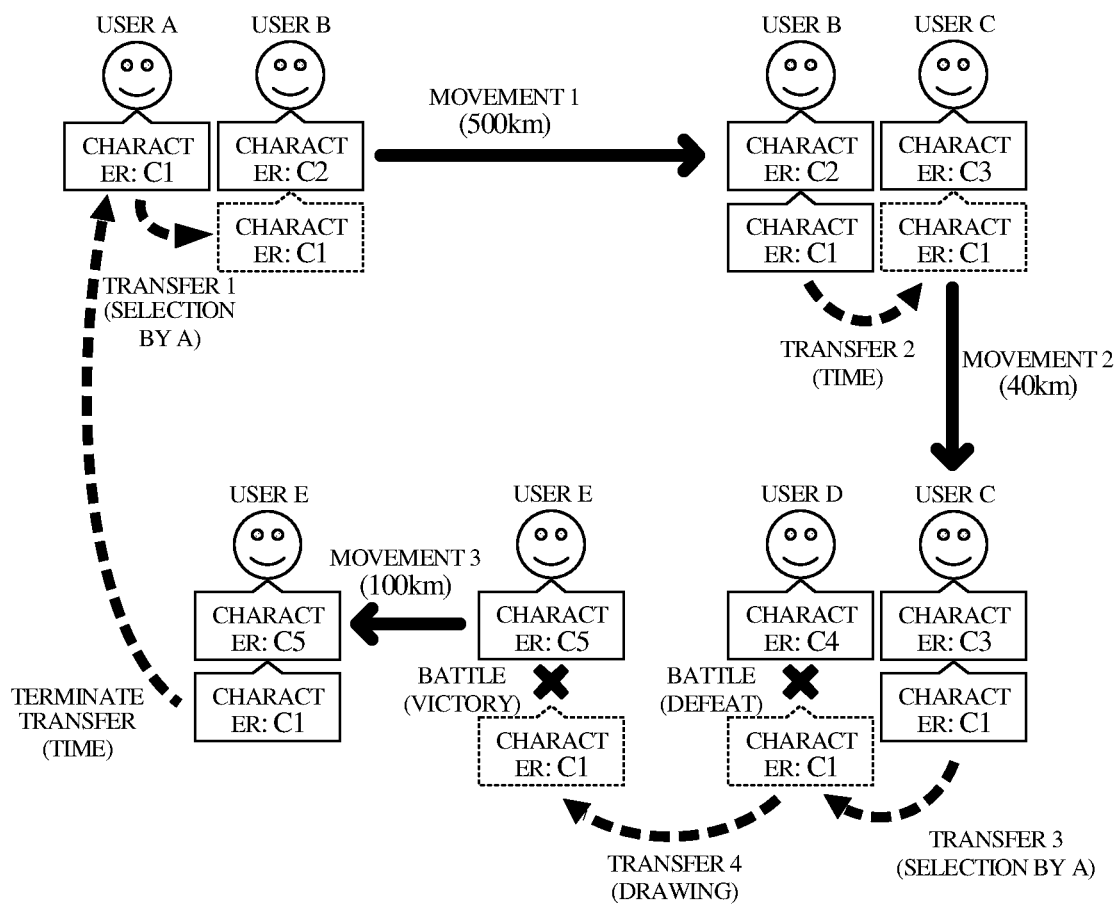
FIG. 1a is a diagram conceptually illustrating progress of an application according to various embodiments of the present disclosure.
Figure 1B:
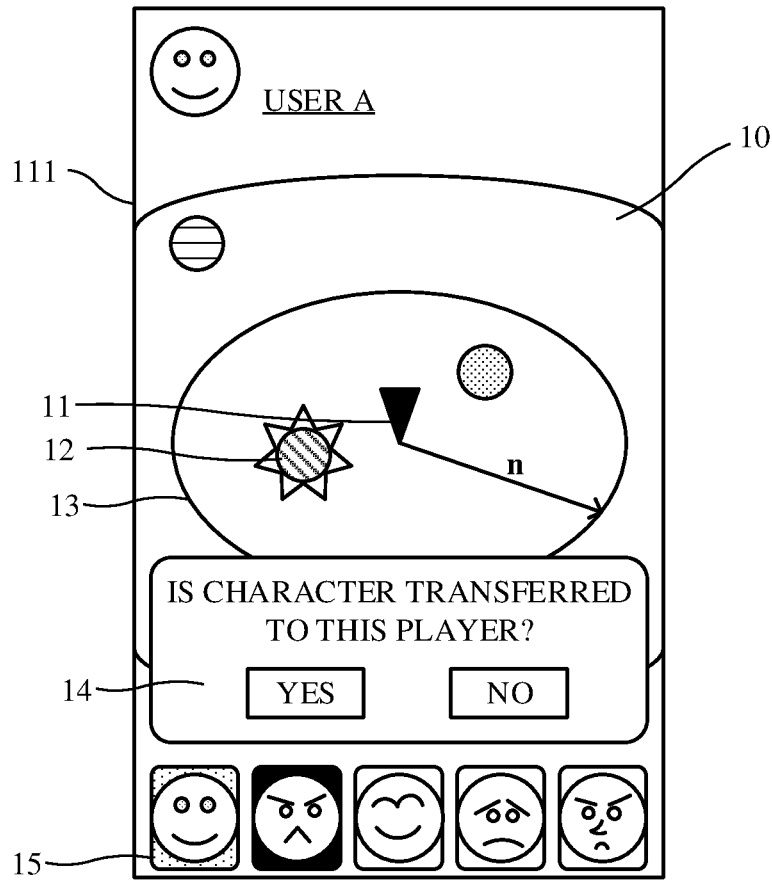
FIG. 1b is a diagram illustrating a screen displayed in a terminal device 100 according to various embodiments of the present disclosure.

Various embodiments of the present disclosure will be described with reference to the appended drawings. Note that the configuration element common in the drawings is denoted with the same reference sign.

<Outline of Application According to Present Disclosure>

An example of an application according to various embodiments of the present disclosure includes an application that allows a user to transfer a virtually owned item to another user, and varies a parameter value of the item according to distance moved with the another user in the real world after transfer.

Typical examples of such an application include game applications such as a battle game in which a plurality of characters battles against one another, a block collapsing game, a puzzle game, a roll-playing game, and a sport game. Hereinafter, an outline of the application according to the present embodiment will be described using a battle game as an example.

FIG. 1a is a diagram conceptually illustrating progress of an application according to various embodiment of the present disclosure. According to FIG. 1a, first, a virtual character C1 operated by a user A is virtually transferred to a user B by selection by the user A (transfer 1). Next, the user B moves to an arbitrary position in the real world, virtually accompanying a his/her own virtual character C2 and the transferred character C1 (movement 1). Then, at the destination, the character C1 is transferred again from the user B to a user C upon a predetermined event (transfer 2). Next, the user C moves to an arbitrary position in the real world, virtually accompanying a his/her own virtual character C3 and the transferred character C1 (movement 2). Then, at the destination, the character C1 is transferred again from the user C to a user D upon a predetermined event (transfer 3). In this case, a virtual battle is performed between the transferred character C1 and a virtual character C4 of the user D by selection of the user D. When the character C1 is defeated, the character C1 cannot continuously keep transferred to the user D, and is transferred to a user E (transfer 4). This time, a virtual battle is performed between the transferred character C1 and a virtual character C5 of the user E by selection of the user E. When the character C1 wins, the character C1 continuously keeps transferred to the user E. Then, the user E moves to an arbitrary position in the real world, virtually accompanying the his/her own virtual character C5 and the transferred character C1 (movement 3). When a second period has passed from the first transfer (transfer 1), the transfer is terminated and the character C1 is returned to the original user A.

In the above-described application, in the present application, the virtual character C1 of the user A can repeat transfer to the various users upon various events. Further, an ability value of the character C1 can be varied at the destination according to the distance (for example, the total of the movement 1 to 3) moved together with the user to which the character C1 is transferred.

That is, in the above-described application, from the viewpoint of the user A, the his/her own virtual character C1 is brought to go on a so-called "journey" with another user, and the character C1 can be strengthened according to the distance of the "journey".

In the above-described application, the transfer is made upon, but obviously not limited to, selection by the user A (the transfer 1 and 3), passage of a first period from when the current transfer (transfer 1) has been performed (transfer 2), or the battle by the virtual characters (transfer 4).

In the above-described application, "transfer", "virtual transfer", or the like is performed. This means that a character ID of the character stored in association with user identification information of the user of the starting point in a user information table is stored in association with user identification information of the user at the destination through processing such as copy or overwrite. Note that, when the character is transferred again from the "user at the destination" to the "user at a new destination", the character ID associated with the user identification information of the "user at the destination" may be completely deleted or may be kept associated.

First Embodiment

Figure 2:
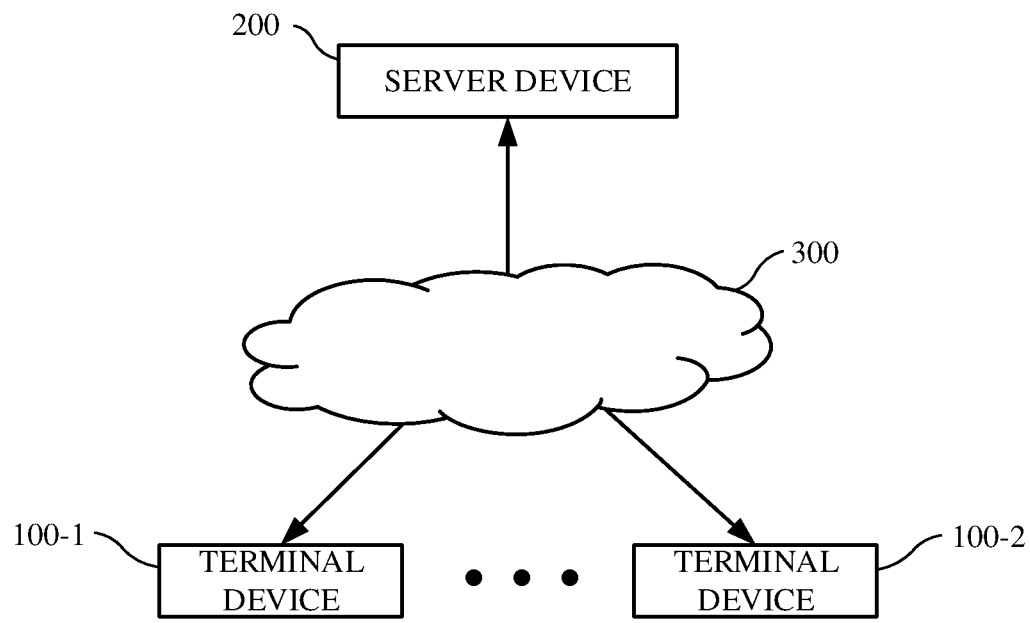
FIG. 2 is a conceptual diagram schematically illustrating a configuration of a system 1 according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes a plurality of terminal devices 100 including at least a terminal device 100-1 and a terminal device 100-2, and a server device 200 communicatively connected to the terminal devices 100 through a network 300. In the system 1, when programs stored in the server device 200 and the terminal device 100 are executed, processing of an application according to the present embodiment is executed. The server device 200 and the terminal devices 100 communicate with each other as needed, and transmit/receive various types of information (for example, FIGS. 5a and 5b), programs, and the like necessary for progress of the application.

Note that, in the example of FIG. 2, only two terminal devices 100 are illustrated. However, three or more terminal devices 100 may be able to be included. Further, the server device 200 is illustrated as a single server device. However, function elements and processing of the server device 200 may be able to be distributed to a plurality of server devices.

In the present embodiment, for convenience of description, the terminal device operated by the user A is referred to as terminal device 100-1, the terminal device operated by the user B is referred to as terminal device 100-2, the terminal device operated by the user C is referred to as terminal device 100-3, the terminal device operated by the user D is referred to as terminal device 100-4, and the terminal device operated by the user E is referred to as terminal device 100-5.

2. Configuration of Terminal Device 100

Figure 3:
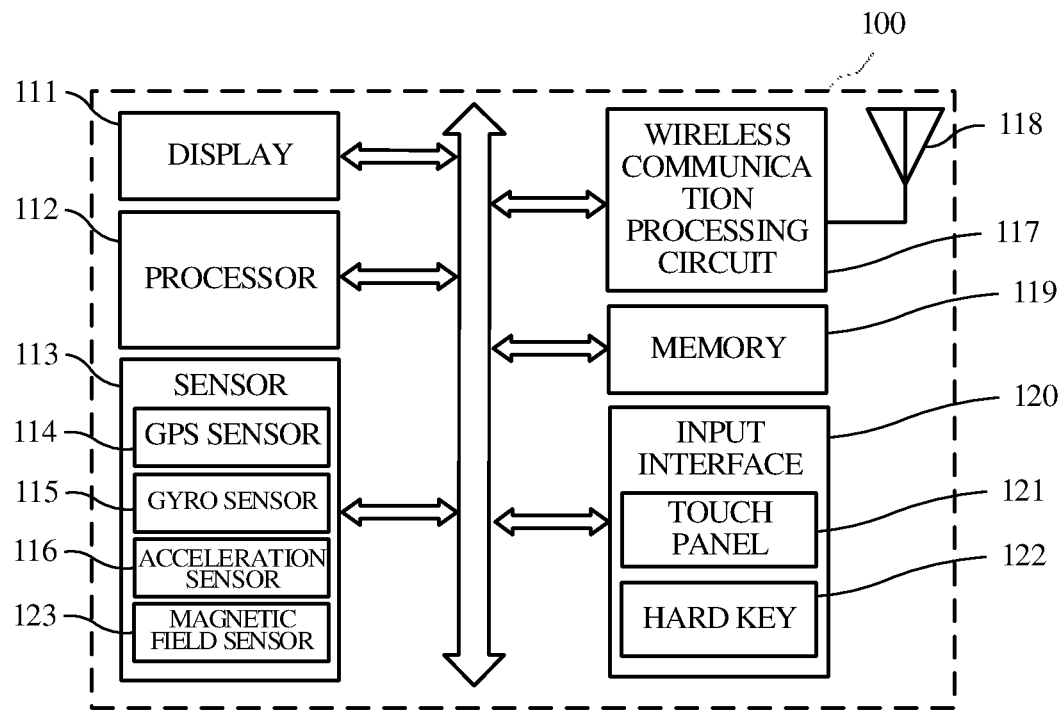
FIG. 3 is a block diagram illustrating an example of a configuration of the terminal device 100 according to the first embodiment of the present disclosure.

FIG. 3 is a block diagram illustrating an example of a configuration of the terminal device 100 according to the first embodiment of the present disclosure. The terminal device 100 does not need to include all the configuration elements illustrated in FIG. 3, and can have a configuration in which a part of the configuration elements is omitted or a configuration to which another configuration element is added.

An example of the terminal device 100 includes a mobile terminal device that can perform wireless communication, represented by a smart phone. However, the present invention can be favorably applied to any device as long as the device can be carried, such as a mobile game device, a feature phone, a mobile information terminal, a PDA, or a lap-top personal computer. Further, the system 1 includes the plurality of terminal devices 100. However, the terminal devices 100 are not necessarily of the same type. For example, the terminal device 100-1 may be a smart phone and the terminal device 100-2 may be a portable game device.

According to FIG. 3, the terminal device 100 includes a display 111, a processor 112, a sensor 113 including a GPS sensor 114, a gyro sensor 115, an acceleration sensor 116, and a magnetic field sensor 123, a communication interface including a wireless communication processing circuit 117 and an antenna 118, a memory 119 including at least a RAM, a ROM, and a non-volatile memory (an HDD in some cases), and an input interface 120 configured from a touch panel 121 and a hard key 122. Then, these configuration elements are electrically connected with one another through a control line and a data line.

The display 111 functions as a display unit that reads out image information stored in the memory 119 and performs various types of display (for example, FIGS. 11a to 11f) according to an instruction of the processor 112. The display 111 is configured from a liquid crystal display, for example.

The input interface 120 is configured from the touch panel 121 and/or the hard key 122, and the like, and receives various instructions and inputs form the user. The touch panel 121 is arranged to cover the display 111, and outputs information of position coordinates corresponding to image data to be displayed on the display 111 to the processor 112. As a touch panel system, a known system such as a resistive film system, an electrostatic capacitive coupling system, or an ultrasonic surface acoustic wave system can be used. In the present embodiment, the touch panel 121 detects a swipe operation and a tap operation for items displayed on the display 111 with an instruction body.

The processor 112 is configured from a CPU (microcomputer), and functions as a control unit that controls connected other configuration elements on the basis of various programs stored in the memory 119. To be specific, the processor 112 reads a program for execution of the application according to the present embodiment and a program for execution of an OS from the memory 119 and executes the programs. The processor 112 generates various types of operation information on the basis of outputs from the input interface 120. Note that the processor 112 may be configured from a single CPU. However, the processor 112 may be configured from a plurality of CPUs. Further, the processor 112 may be configured from an appropriate combination of other types of processors such as a GPU dedicated to image processing.

The memory 119 is configured from the ROM, the RAM, the non-volatile memory, the HDD, and the like, and functions as a storage unit. The ROM stores the application according to the present embodiment and an instruction command for execution of the OS as programs. The RAM is a memory used to write and read data while the programs stored in the ROM are processed by the processor 112. The non-volatile memory is a memory in which write and read of data are executed by execution of the programs, and the data written here is stored after the execution of the programs is terminated.

The wireless communication processing circuit 117 performs processing such as modulation and demodulation in order to transmit/receive information to/from the remotely installed server device 200 and other terminal devices through the connected antenna 118. The wireless communication processing circuit 117 performs processing for reception of the program for execution of the application according to the present embodiment, various types of information used in the application, and the like from the server device 200, according to the progress of the application. Further, the wireless communication processing circuit 117 performs processing for transmission of a result of the processing by the execution of the application to the server device 200.

The wireless communication processing circuit 117 performs processing by a broadband wireless communication system represented by a wideband-code division multiple access (W-CDMA) system. However, the processing can be performed on the basis of a system related to a wireless LAN represented by IEEE802.11 or narrowband wireless communication such as Bluetooth (registered trademark).

The communication circuit including the wireless communication processing circuit 117 and the antenna 118 functions as a communication unit. Note that wired communication can be used in place of or in addition to the wireless communication. In this case, a communication processing circuit for the wired communication may just be provided in place of or in addition to the wireless communication processing circuit 117.

The sensor 113 includes the GPS sensor 114, the gyro sensor 115, the acceleration sensor 116, and the magnetic field sensor 123. The GPS sensor 114 detects a current position of the terminal device 100 by communication with a plurality of satellites. Detected positional information is transmitted to the server device 200 through the communication circuit by control of the processor 112. Note that a current place is detected by the sensor 113 in the present embodiment. However, an embodiment is not limited thereto, and any information can be used as long as the information is current place information, such as information of an access point of WiFi or of a base station of the broadband wireless communication.

3. Configuration of Server Device 200

Figure 4:
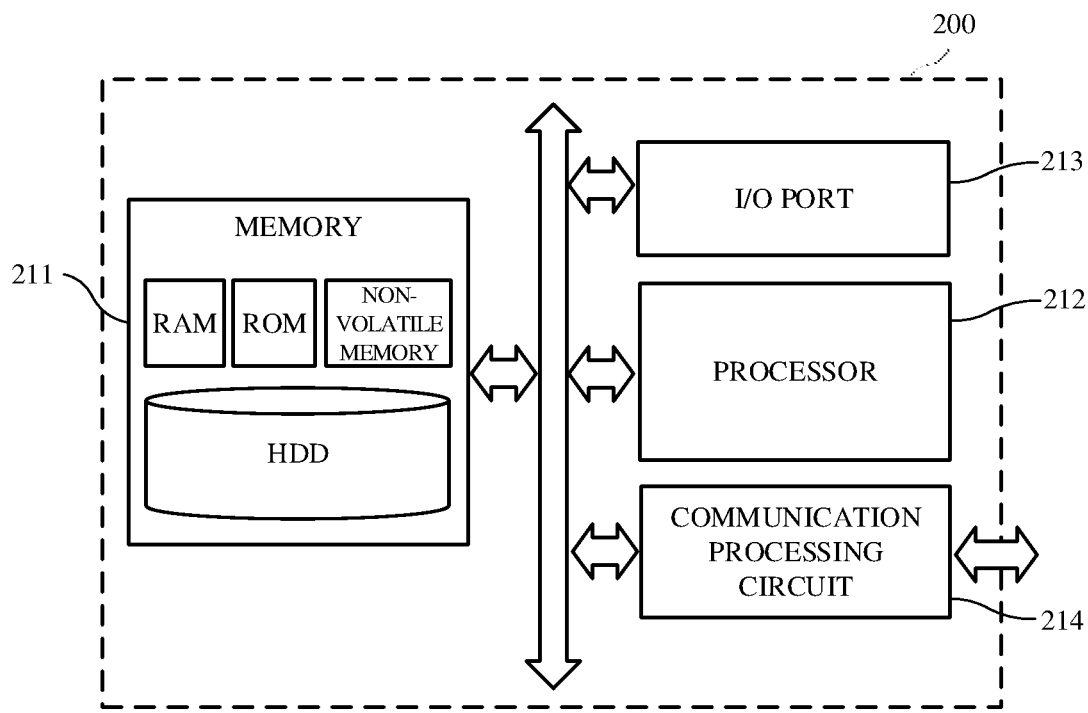
FIG. 4 is a block diagram illustrating an example of a configuration of a server device 200 according to the first embodiment of the present disclosure.

FIG. 4 is a block diagram illustrating an example of a configuration of the server device 200 according to the first embodiment of the present disclosure. The server device 200 does not need to include all the configuration elements illustrated in FIG. 4, and can have a configuration in which a part of the configuration elements is omitted or a configuration to which another configuration element is added.

According to FIG. 4, the server device 200 includes a memory 211 including a RAM, a ROM, a non-volatile memory, and an HDD, a processor 212 configured from a CPU and the like, an I/O port 213, and a communication interface including a communication processing circuit 214. Then, these configuration elements are electrically connected with one another through a control line and a data line.

The memory 211 is configured from the ROM, the RAM, the non-volatile memory, and the HDD, and functions as a storage unit.

Then, the memory 211 stores the application according to the present embodiment and an instruction command for execution of the OS as programs. Such programs are loaded and executed by the processor 212. Further, the memory 211 stores a user information table and a character information table illustrated in FIGS. 5a and 5b. Further, the memory (particularly RAM) is temporarily used to execute write and read of data while the programs are processed by the processor 212.

The processor 212 is configured from a CPU (microcomputer), and functions as a control unit that controls connected other configuration elements on the basis of various programs stored in the memory 211. For example, the processor 212 controls processing of extracting other terminal devices existing within a predetermined range from the current place of the terminal device 100 and selecting another terminal device to which a character is transferred, processing regarding association of the user to which the character is transferred and the character, and the like, by reference to the various types of information (FIGS. 5a and 5b) stored in the memory 211. Further, the processor 212 controls the communication processing circuit 214 to transmit/receive the various types of information (FIGS. 5a and 5b) to/from the plurality of terminal devices 100. Further, the processor 212 controls the memory 211 to perform read and update processing of the various types of information (FIGS. 5a and 5b) stored in the memory 211. Note that the processor 212 may be configured from a single CPU. However, the processor 212 may be configured from a plurality of CPUs.

The communication processing circuit 214 performs processing such as modulation and demodulation in order to transmit and receive a program for execution of a game application according to the present embodiment, and various types of information, through the terminal device 100 and the network 300, or through another server device and the network 300, as an example. The communication processing circuit 214 communicates with the terminal devices or another server device according to the above-described wireless communication system or a known wired communication system. In the present embodiment, as one of information to be received, information regarding a moving distance of the user in the real world is included. The information regarding the moving distance may be any information as long as the information is usable to calculate the moving distance in the server device 200, such as information of the moving distance itself calculated in the terminal device 100 held by each user, or information of a current position detected in each terminal device.

The I/O port 213 functions as an information input/output unit for inputting/outputting information from/to various external devices such as a printer although not particularly illustrated. As the I/O port 213, a known connection system can be employed at the request such as a serial port, a parallel port, an USB and the like.

4. Information Stored in Memory of Server Device 200

FIG. 5a is a diagram conceptually illustrating the user information table stored in the server device 200 according to the first embodiment of the present disclosure. As an example, the user information table is stored in the HDD of the memory 211 of the server device 200.

According to FIG. 5a, a user name, an application currency, a character, a destination, and positional information are stored in association with a user ID (user identification information). The "user ID (user identification information)" is unique information provided to each user and is information for identifying each user. The "user name information" indicates a name used by each user in the application. The "application currency information" indicates at least an amount of a virtual currency available in the application according to the present embodiment. The application currency is decreased when an item such as a character or equipment of a character is purchased in progress of the application, and can be newly acquired according to payment using a currency in the real world or the progress of the application. The "character" is one of the "items" in the present embodiment. A "character ID (character identification)" indicates information for identifying the character. The character identified with the character ID can be operated by an instruction input of the user who has the user ID associated with the character ID. The "destination information" indicates a current destination of the character associated with the user ID. To be specific, the character C1 of the user A in FIG. 5a has been transferred to the user D, and is thus stored in association with the user ID (U4) of the user D. The appropriate information is updated as needed every time the transfer is performed. The "positional information" is information indicating a current place of each user. The appropriate information is updated as needed upon receipt of the current positional information detected in each terminal device. Further, the appropriate information is used when "distance information" of the character is calculated or the like.

FIG. 5b is a diagram conceptually illustrating the character information table stored in the server device 200 according to the first embodiment of the present disclosure. As an example, the character information table is stored in the HDD of the memory 211 of the server device 200.

According to FIG. 5b, ability value parameters such as offensive power, defensive power, recovery power, and a hit point, and information such as the number of times, time, total time, and distance are associated with a character ID (character identification information). Although not particularly illustrated, an equipment item, and the like of each character can also be stored. The "character ID (character identification information)" is unique information provided to each character and is information for identifying each character. The "offensive power" is one of the ability values and is a parameter used to calculate damage to be provided to a character or the like that is an opponent at the time of an attack by the appropriate character. The "defensive power" is a parameter used to calculate damage provided by an attack from the character that is an opponent. The "hit point" is a parameter decrease by a predetermined amount according to the provided damage. The hit point of the character becoming zero means that a unit game is processed as "defeat" or use of the character is restricted. The "recovery power" is a parameter used to calculate an amount of recovery when the decreased hit point is recovered. The "number of times information" indicates the number of times of transfer of a character to other users. Once the transfer is terminated, the number of times information is returned to zero. The "time information" indicates a period from when the appropriate character has been associated with a user currently stored as the destination information in FIG. 5a. That is, the time information is reset to zero every time a new user ID is associated as the destination information, and the count is started from zero. The "total time information" indicates a period from when the appropriate character is first associated with another user ID. That is, when the transfer is once terminated, the total time information is reset to zero, and the count is started from zero when new transfer is started. The "distance information" is calculated on the basis of the current positional information of the user to which the appropriate character has been transferred, to be specific, the current positional information (FIG. 5a) measured by the terminal device held by the user to which the appropriate character has been transferred. A distance by which the user has moved while the appropriate character is kept transferred is accumulated. Note that the distance information is accumulated until the transfer is once terminated after the first transfer is performed. That is, in a case where the transfer is terminated after the appropriate character has been sequentially transferred to a plurality of users, the total of the moving distance of the users is stored as the distance information.

5. Processing Sequence Between Terminal Devices 100 and Server Device 200

[Transfer 1 in FIG. 1a]

Figure 6A:
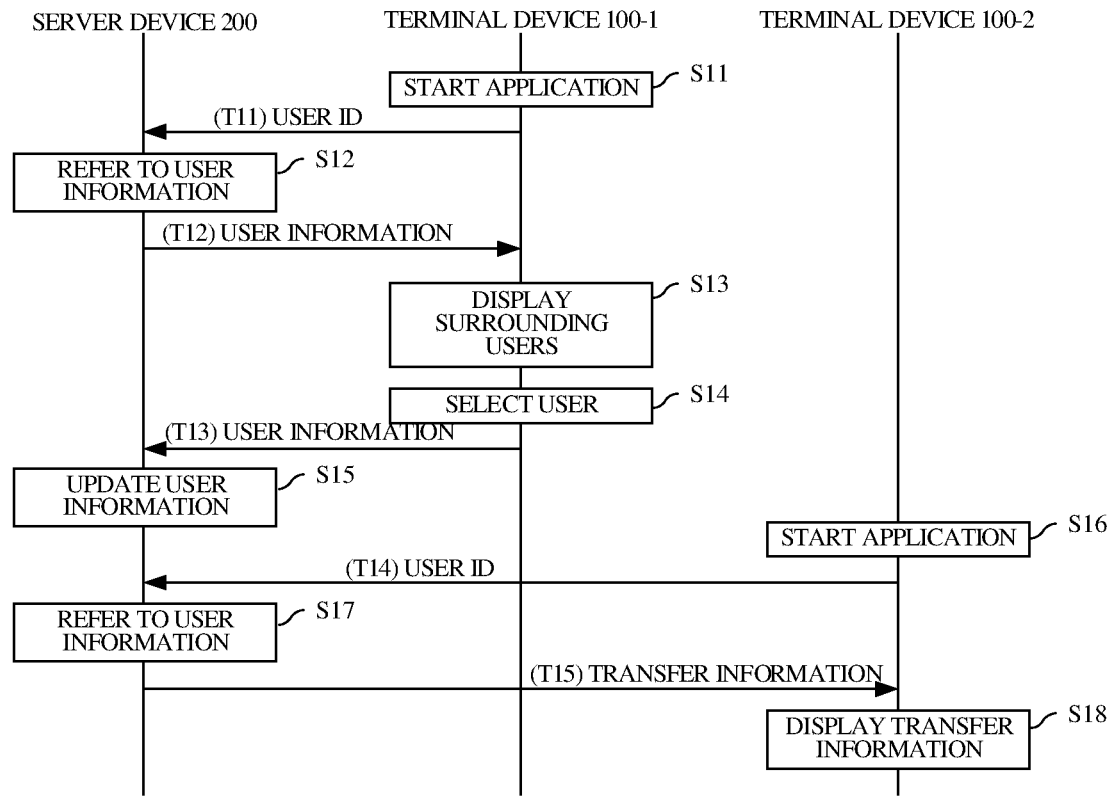
FIG. 6a is a diagram illustrating a processing sequence between the terminal devices 100 and the server device 200 according to the first embodiment of the present disclosure.

FIG. 6a is a diagram illustrating a processing sequence between the terminal devices 100 and the server device 200 according to the first embodiment of the present disclosure. To be specific, FIG. 6a illustrates a processing sequence of when transfer 1 in FIG. 1a is made. That is, the terminal device 100-1 in FIG. 6a illustrates the terminal device held by the user A and the terminal device 100-2 illustrates the terminal device held by the user B.

According to FIG. 6a, when the application according to the present embodiment is started in the terminal device 100-1 (S11), the user ID is transmitted to the server device 200 (T11). When the server device 200 receives the user ID, the processor 212 of the server device 200 performs control to refer to the user information table (S12), and transmits the user information corresponding to the user ID to the terminal device 100-1 (T12). When the terminal device 100-1 receives the user information, the processor 112 of the terminal device 100-1 displays a map screen including the current place of the user A and users around the user A on the display 111 (S13). Next, when the user (user B) to which the character C1 of the user A is to be transferred is selected by an instruction input of the user A in the terminal device 100-1 (S14), the processor 112 of the terminal device 100-1 transmits the user ID of the selected user B to the server device 200 (T13).

As for the positional information of each terminal device 100, the positional information detected as needed is transmitted from the terminal device 100 to the server device 200 and is stored in the user information table. Then, to display the surrounding users in S13, first, the terminal device 100-1 transmits the current positional information of the terminal device 100-1 to the server device 200. Next, the server device 200, which has received the positional information, refers to the positional information of other users stored in the user information table, and extracts other users existing within a predetermined range from the current positional information of the server device 200. Then, the server device 200 transmits the user IDs of the extracted users and the positional information to the terminal device 100-1. The terminal device 100-1, which has received the user IDs and the positional information, displays the map screen on the basis of the received information. Note that, in the example of FIG. 6a, the extracted users include at least the user B (FIG. 1a) that holds the terminal device 100-2.

Figure 11A:
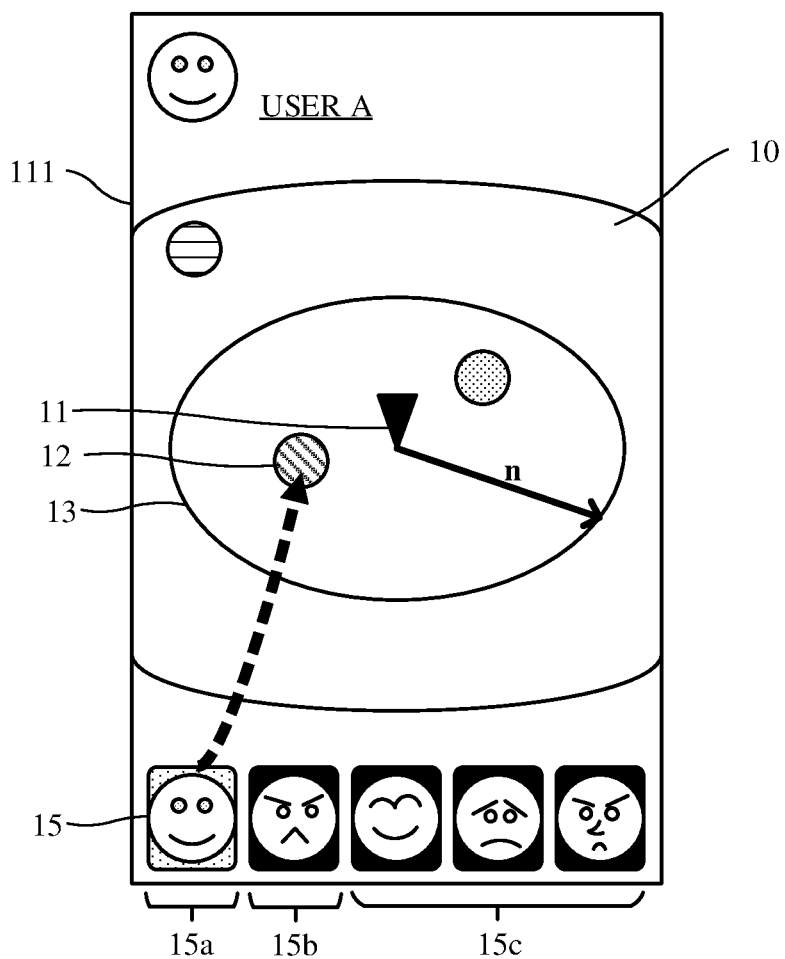
FIG. 11a is a diagram illustrating an example of a screen displayed on a display 111 of the terminal device 100 according to the first embodiment of the present disclosure.

FIG. 11a is a diagram illustrating an example of a screen displayed on the display 111 of the terminal device 100 according to the first embodiment of the present disclosure. To be specific, FIG. 11a is a diagram illustrating an example of the map screen displayed in the terminal device 100-1 in S13. According to FIG. 11a, the display 111 displays a map 10 corresponding to the real world, centered around a current place icon 11 indicating the current place of the user A. Then, the users existing around the current place of the user A (for example, the users 5 km around) are superimposed and displayed on the map 10. Further, a circle 13 that indicates a range selectable by the user A as the destination, that is, a predetermined range (3 km around, for example) from the current place of the user A is displayed.

Further, character trays are displayed in a lower portion of the display 111. Images 15b and 15c of other characters associated with the user ID of the user A are displayed on the character trays in addition to an image 15a of the character C1 that is the own character of the user A. The user A can select a user to which the own character C1 is to be transferred by touching the image 15a of the character C1 and dragging the image 15a onto a user icon 12 to which the character C1 is to be transferred.

Figure 11B:
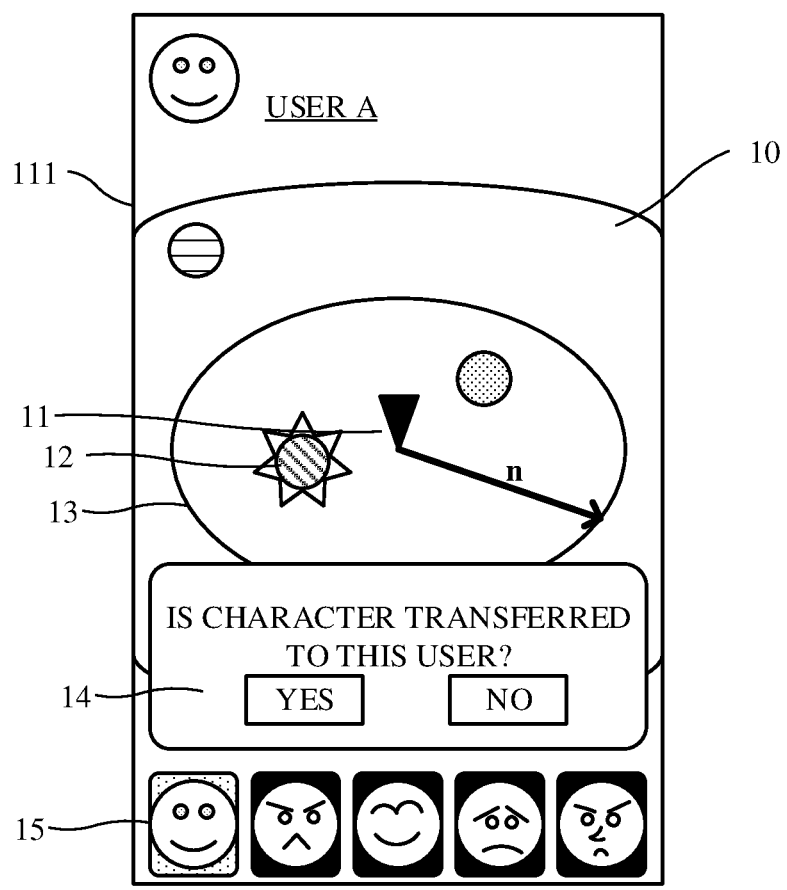
FIG. 11b is a diagram illustrating an example of a screen displayed on the display 111 of the terminal device 100 according to the first embodiment of the present disclosure.

FIG. 11b is a diagram illustrating an example of a screen displayed on the display 111 of the terminal device 100 according to the first embodiment of the present disclosure. To be specific, FIG. 11b is a diagram illustrating an example of a screen displayed in the terminal device 100-1 when selection of the destination has not been made in S14. According to FIG. 11b, when the user icon 12 is selected as the destination, the user icon 12 indicating the current place of the user B, a display 14 that prompts the user A to confirm transfer is displayed. When the user A selects an icon "YES", the transfer to the user B is determined.

Referring back to FIG. 6a, when the server device 200 receives the user ID of the user B, the processor 212 of the server device 200 updates the user information table to store the user ID (U2) of the user B to destination information of the character C1 in the user information table (S15). That is, the processor 212 of the server device 200 performs control to store the character C1, which is associated with the user ID (U1) of the user A, further in association with the user ID of the user B.

Meanwhile, when the application according to the present embodiment is started in the terminal device 100-2 (S16), the user ID (U2) is transmitted to the server device 200 (T14). When the server device 200 receives the user ID (U2), the processor 212 of the server device 200 refers to the user information table (S17), and transmits the information of the character C1 associated with the user ID (U2) of the user B to the terminal device 100-2 as transfer information (T15). The terminal device 100-2, which has received the transfer information, displays notification that notifies the user B of association of the character C1 with the user B (S18).

[Transfer 2 of FIG. 1*a*]

Figure 6B:
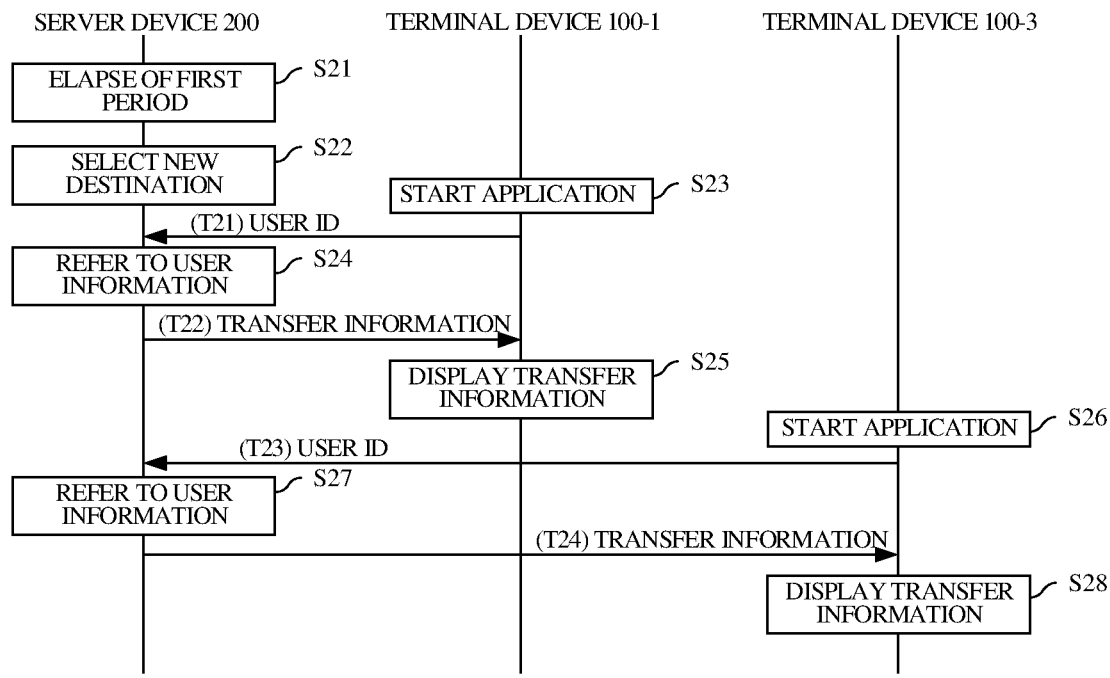
FIG. 6b is a diagram illustrating a processing sequence between the terminal devices 100 and the server device 200 according to the first embodiment of the present disclosure.

FIG. 6*b* is a diagram illustrating a processing sequence between the terminal devices 100 and the server device 200 according to the first embodiment of the present disclosure. To be specific, FIG. 6*b* illustrates a processing sequence of when transfer 2 in FIG. 1*a* is made. That is, the terminal device 100-1 in FIG. 6*b* illustrates the terminal device held by the user A and the terminal device 100-3 illustrates the terminal device held by the user C. Note that the terminal device 100-2 held by the user B is not illustrated.

The transfer 2 is performed after the transfer 1 is performed, in other words, the transfer 2 is performed after a first period (for example, 24 hours) has passed from when the character C1 of the user A is associated with the user ID (U2) of the user B. For example, in a case where the user B does not execute the application according to the present embodiment at all although the character C1 has been transferred to the user B, the character C1 is continuously kept transferred to the user B. However, when the first period has passed, the character C1 is forcibly transferred to another user, whereby opportunities of transfer are increased, and enjoyment can be enhanced.

According to FIG. 6*b*, the processor 212 of the server device 200 periodically refers to the character information table, and checks whether there is a character existing after the elapse of the first period. When the character C1 is confirmed to exist after the elapse of the first period (S21), the processor 212 selects a new destination (S22). Note that this selection of a new destination may be performed by random drawing by the processor 212. Alternatively, the user B or the user A may select a user from among other users existing in a predetermined range of the user B where the character C is currently transferred. That is, any selection method can be employed as long as another user is selected. The example of FIG. 6*b* illustrates a case in which the user C is selected by random drawing by the processor 212.

When the user C is selected as the new destination by the processor 212 of the server device 200, the processor 212 updates the user information table to store the character C1, which has been associated with the user ID (U1) of the user A, in association with the user ID of the user C. After that, in the terminal device 100-1 of the user A who is the owner of the character C1 and the terminal device 100-3 of the user C that is the new destination of the character C1, the respective processor 112 of the terminal devices perform control to display the transfer information at timing when the applications are respectively started (S23 to S25 and S26 to S28). Note that the processing is similar to the processing of S16 to S18 of FIG. 6*a*, and thus description is omitted.

[Transfer 3 of FIG. 1*a*]

Figure 6C:
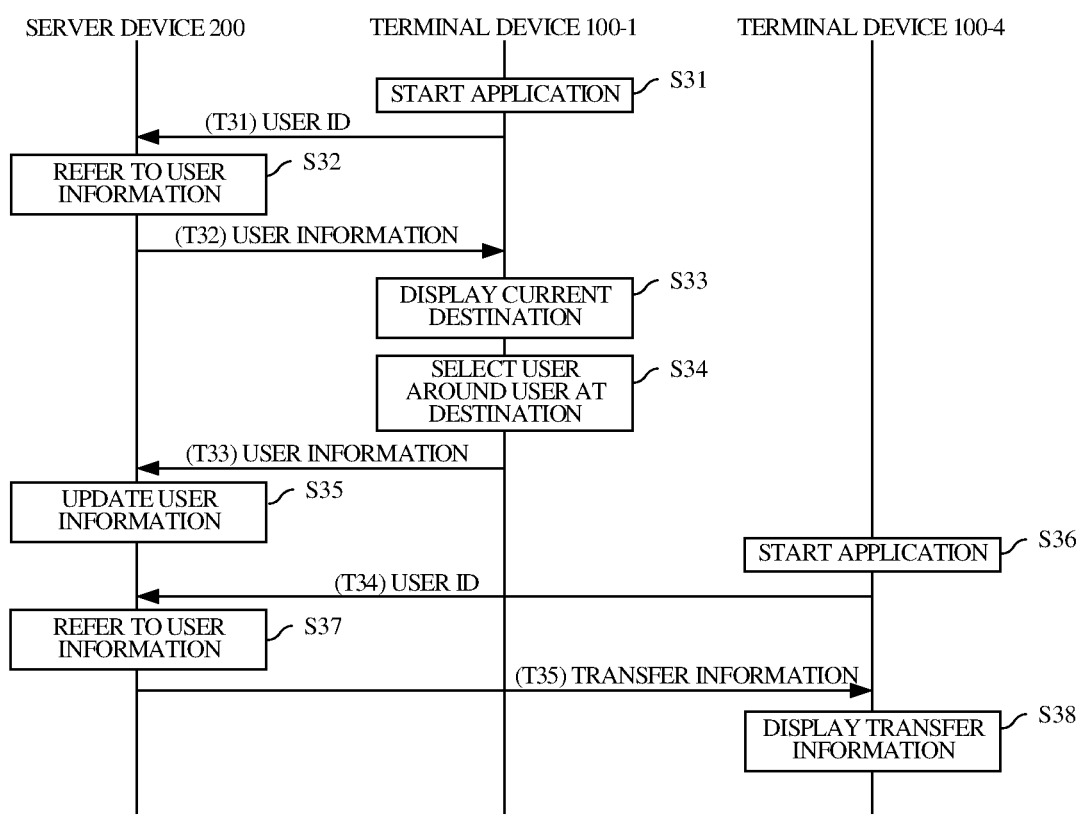
FIG. 6c is a diagram illustrating a processing sequence between the terminal devices 100 and the server device 200 according to the first embodiment of the present disclosure.

FIG. 6*c* is a diagram illustrating a processing sequence between the terminal devices 100 and the server device 200 according to the first embodiment of the present disclosure. To be specific, FIG. 6*c* illustrates a processing sequence of when transfer 3 in FIG. 1*a* is made. That is, the terminal device 100-1 in FIG. 6*c* illustrates the terminal device held by the user A and the terminal device 100-4 illustrates the terminal device held by the user D. Note that the terminal device 100-3 held by the user C is not illustrated.

The transfer 3 is executed when the user A wishes to make transfer to various other users without waiting for the first period, for example. That is, the transfer 3 is performed by associating the character C1, which has been associated with the user ID (U3) of the user C, with a user ID (U4) of another user (user D) by an instruction input from the user A.

According to FIG. 6*c*, when the application according to the present embodiment is started in the terminal device 100-1 (S31), the user ID is transmitted to the server device 200 (T31). When the server device 200 receives the user ID, the processor 212 of the server device 200 performs control to refer to the user information table (S32), and transmits the user information corresponding to the user ID to the terminal device 100-1 (T32). The processor 112 of the terminal device 100-1 displays a character selection screen on the display 111 on the basis of the received user information (S33). Then, when the character C1, which is the own character of the terminal device 100-1, is selected on the character selection screen, the processor 112 displays, on the display 111, a map screen of the user C that is the current destination.

Figure 11C:
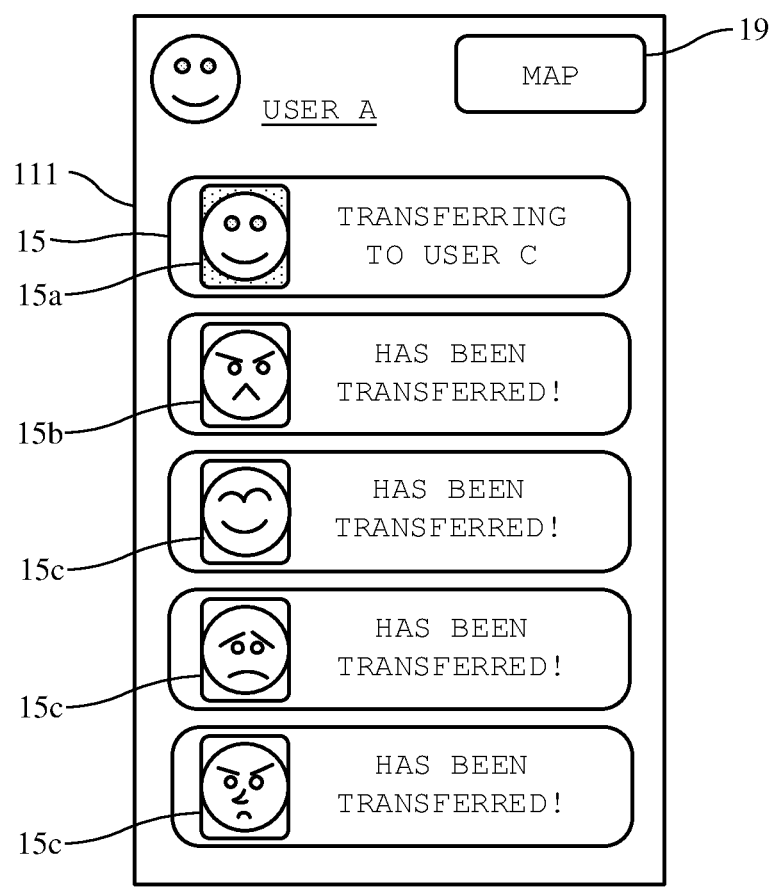
FIG. 11c is a diagram illustrating an example of a screen displayed on the display 111 of the terminal device 100 according to the first embodiment of the present disclosure.

FIG. 11*c* is a diagram illustrating an example of a screen displayed on the display 111 of the terminal device 100 according to the first embodiment of the present disclosure. To be specific, FIG. 11*c* is a diagram illustrating an example of the character selection screen displayed in the terminal device 100-1 in S13. According to FIG. 11*c*, the current destination information ("in transfer to the user C") is displayed in association with the image 15*a* of the own character C1. Further, the images 15*b* and 15*c* of other characters transferred from other users and associated with the own user ID of the user A are displayed. The map screen of the user C can be displayed by selection of the image 15*a* of the own character C1 by the user A. Note that the screen can be switched to and display the map screen by tapping of a map screen icon 19 by the user. Further, a character selection screen icon can be displayed on the map screen and the screen can be switched to and display the character selection screen by tapping the icon.

Figure 11D:
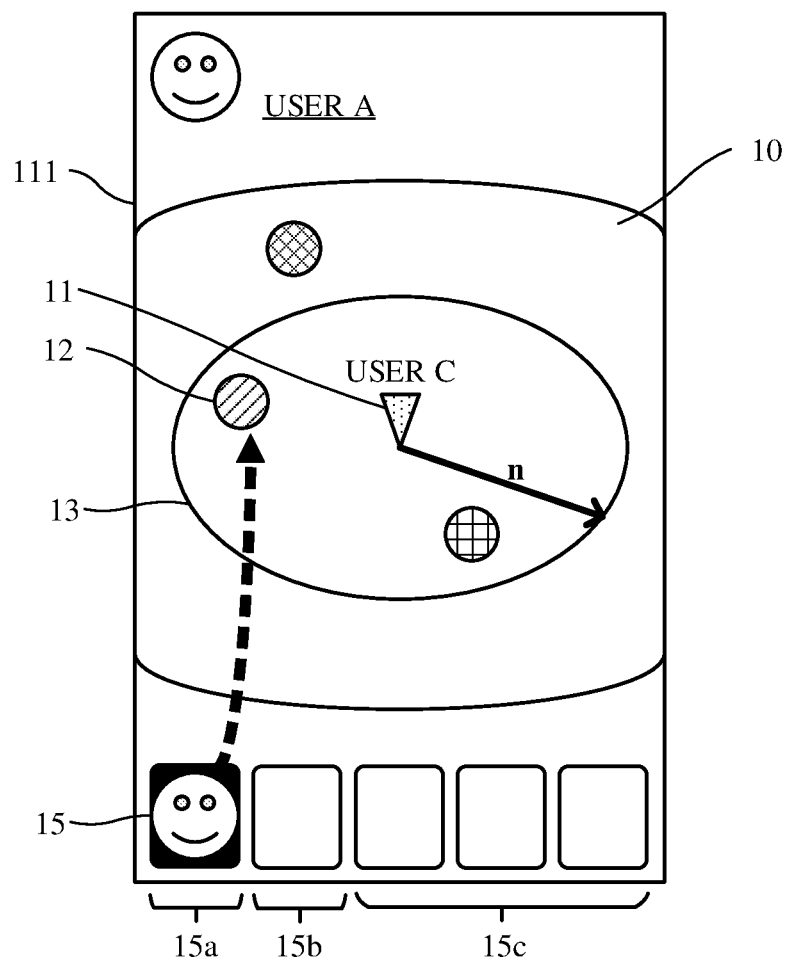
FIG. 11d is a diagram illustrating an example of a screen displayed on the display 111 of the terminal device 100 according to the first embodiment of the present disclosure.

FIG. 11*d* is a diagram illustrating an example of a screen displayed on the display 111 of the terminal device 100 according to the first embodiment of the present disclosure. To be specific, FIG. 11*d* is a diagram illustrating an example of the map screen of the user C displayed in the terminal device 100-1. According to FIG. 11*d*, other users around the current place of the user C are superimposed and displayed on the map 10, centered around the current place icon 11 indicating the current place of the user C. Further, the image 15*a* of the character C1 of the user A is displayed on the character tray. On the map screen of the user C, the user A can select a user to which the own character C1 is to be transferred by tapping the image 15*a* of the own character C1 and dragging the image 15*a* onto the user icon 12 of another user to which the character C1 is to be transferred. Since only the own character C1 of the user A is operable on the map screen of the user C, information of other characters associated with the user C is not displayed (the trays of the images 15*b* and 15*c* are displayed blank).

Referring back to FIG. 6*c*, when another user (user D) around the user C is selected by the user A on the map screen (FIG. 11*d*) centered around the user C (S34), the processor 112 of the terminal device 100-1 transmits the user ID of the selected user D to the server device 200 (T33). When the server device 200 receives the user ID of the user D, the processor 212 of the server device 200 updates the user information table to store the character C1, which has been associated with the user ID (U1) of the user A, in association with the user ID (U4) of the user D. After that, the processor 112 of the terminal device performs control to display the transfer information (T34) at timing when the application is started in the terminal device 100-4 of the user D that is the new destination of the character C1 (S36 to S38). Note that the processing is similar to the processing of S16 to S18 of FIG. 6a, and thus description is omitted.

[Transfer 4 of FIG. 1a]

Figure 6D:
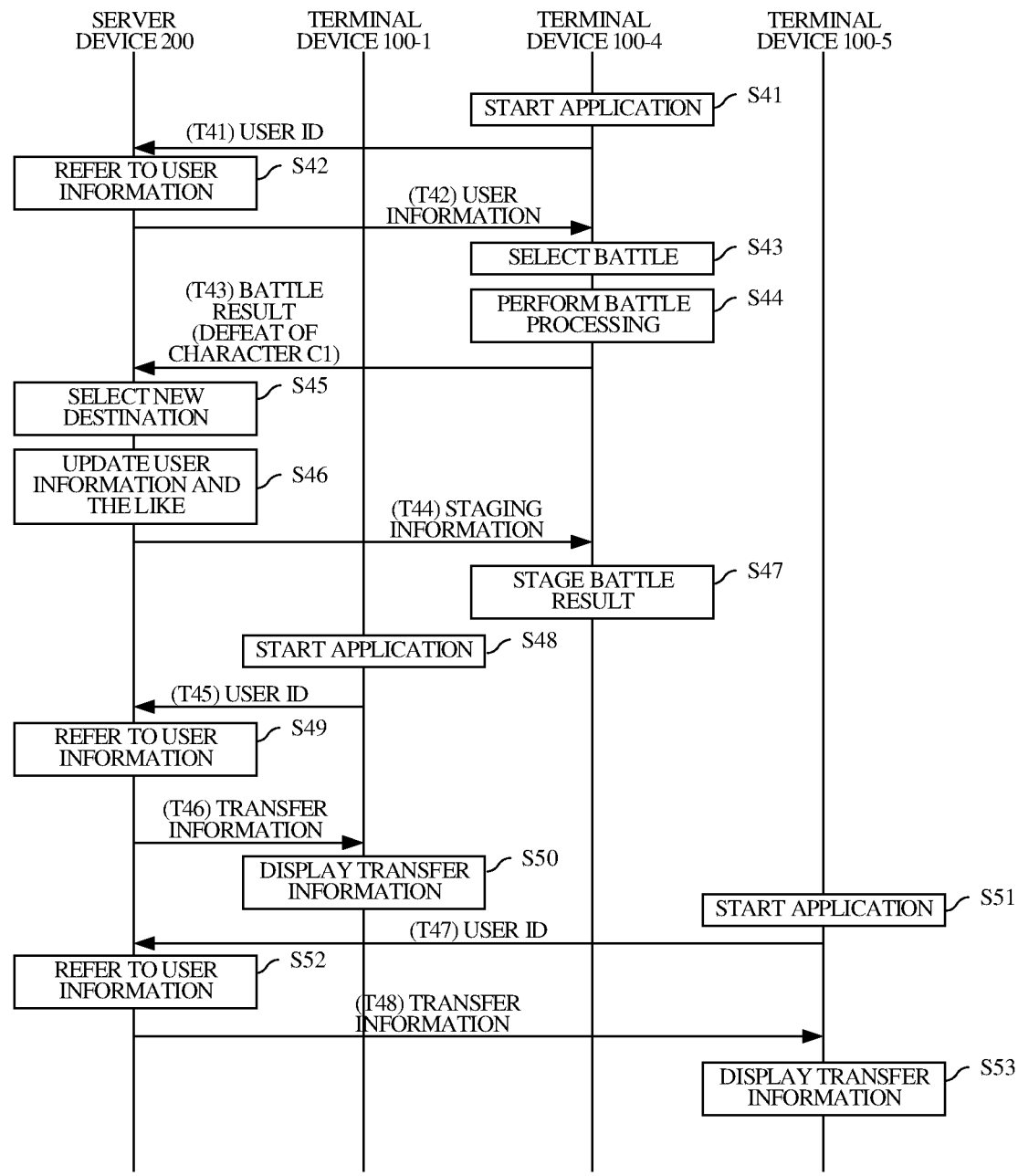
FIG. 6d is a diagram illustrating a processing sequence between the terminal devices 100 and the server device 200 according to the first embodiment of the present disclosure.

FIG. 6d is a diagram illustrating a processing sequence between the terminal devices 100 and the server device 200 according to the first embodiment of the present disclosure. To be specific, FIG. 6d illustrates a processing sequence of when transfer 4 in FIG. 1a is made. That is, the terminal device 100-1 in FIG. 6d illustrates the terminal device held by the user A, the terminal device 100-4 illustrates the terminal device held by the user D, and the terminal device 100-5 illustrates the terminal device held by the user E.

The transfer 4 is executed when the user D battles against the character C1 of the user A in the terminal device 100-4 that receives notification that the character C1 of the user A has been transferred, for example. According to FIG. 6d, when the application according to the present embodiment is started in the terminal device 100-4 (S41), the user ID (U4) is transmitted to the server device 200 (T41). When the server device 200 receives the user ID (U4), the processor 212 of the server device 200 performs control to refer to the user information table (S42), and transmits the user information c (including transfer information) corresponding to the user ID (U4) to the terminal device 100-4 (T42). Then, the transfer information is displayed in the terminal device 100-4 of the user D. Note that the processing from S41 to the display of the transfer information is the same as the processing of S36 to S38 in FIG. 6c.

When the transfer information is displayed, and a battle against the character C1 is selected by the user D (S43), battle processing is performed by the terminal device 100-4 and the server device 200 (S44). Although details of the battle processing is not described, various types of battle processing, such as block collapsing, puzzle, sports, or combat, is applicable at the request. Further, the character C1 that is an opponent of the character C4 that is the character of the user D may be operated by a computer or may be operated by the user A if the timing is right.

Figure 11E:
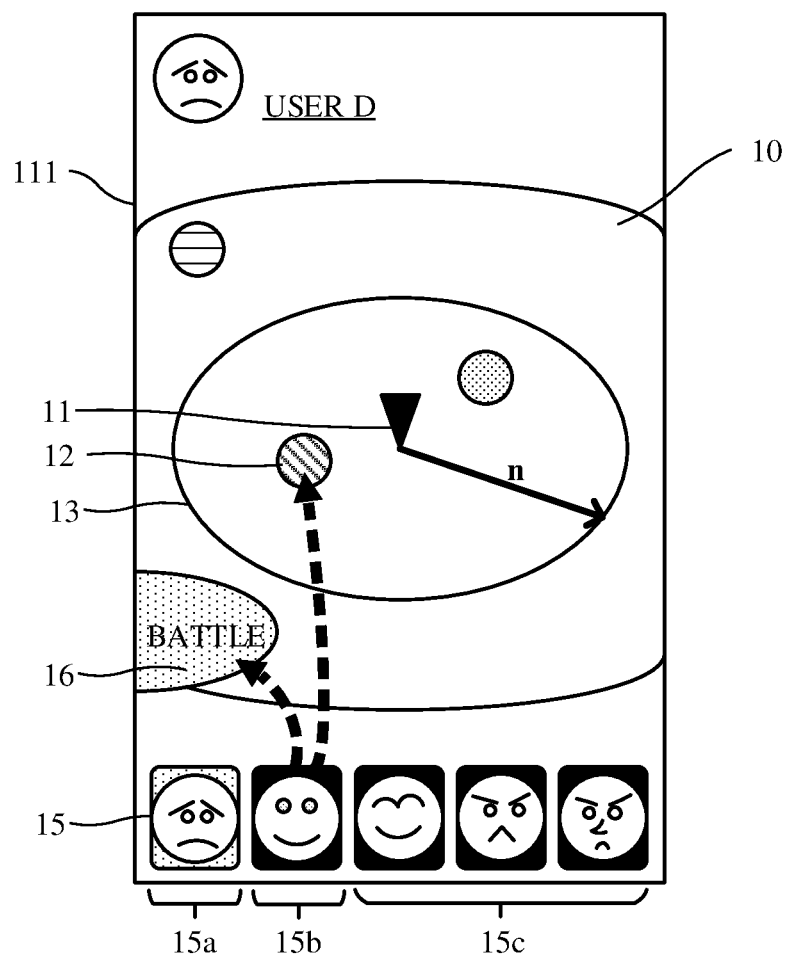
FIG. 11e is a diagram illustrating an example of a screen displayed on the display 111 of the terminal device 100 according to the first embodiment of the present disclosure.

FIG. 11e is a diagram illustrating an example of the screen displayed on the display 111 of the terminal device 100 according to the first embodiment of the present disclosure. To be specific, FIG. 11e is a diagram illustrating an example of a map screen displayed in the terminal device 100-4. According to FIG. 11e, other users around the current place of the user D are superimposed and displayed on the map 10, placing the current place icon 11 indicating the current place of the user D in the center. Further, an image 15a of the character C4 of the user D, an image 15b of the character C1 of the user A, which is currently kept transferred, and images 15c of other characters are displayed on the character trays. When the user D taps the image 15b of the character C1 of the user A on the map screen, a battle icon 16 is displayed. At this time, when the user D drags the image 15b of the character C1 onto the battle icon 16, the battle between the character C1 and the character C4 that is the own character of the user D is selected, as described in S43. Meanwhile, when the user D drags the image 15b of the character C1 onto the user icon 12 of another user existing around the user D, the user corresponding to the user icon 12 is selected as a new destination of the character C1.

Referring back to FIG. 6d, when the battle processing of S44 is terminated, battle result information (T43) is transmitted from the terminal device 100-4 to the server device 200. Note that, in FIG. 6d, defeat of the character C1 is transmitted as the battle result information. When the server device 200 receives the battle result information that indicates defeat of the character C1, the processor 212 of the server device 200 selects a new destination of the character C1 (S45). Note that this selection of a new destination may be performed by random drawing by the processor 212, or by selection by the user D to which the character C is currently kept transferred, or by selection of the user A upon notification. That is, any selection method can be employed as long as another user is selected. The example of FIG. 6d illustrates a case in which the user E is selected by random drawing by the processor 212.

When the user E is selected as the new destination, the processor 212 of the server device 200 updates the user information table to store the character C1, which has been associated with the user ID (U1) of the user A, in association with the user ID (U5) of the user E (S46). Note that, in the present embodiment, as a privilege of the user D for victory of the battle against the C1, a virtual currency available in the application can be provided to the user D, or the character C1 that is the opponent can be provided to the user D as a character of the user D. Therefore, the processor 212 updates the user information table according to the provided privilege (S46). Further, the processor 212 transmits information indicating the provided privilege to the terminal device 100-4 as staging information (T44). When the terminal device 100-4 receives the staging information, the processor 112 of the terminal device 100-4 displays, on the display 111, battle result staging for notifying the user D of the privilege (S47).

FIG. 6d illustrates processing of after the character C1 is transferred to the new destination. However, processing of S48 to S50 and processing of S51 to S53 are similar to the processing of S16 to S18 of FIG. 6a, and thus description is omitted.

[Battle Processing in User E in FIG. 1a]

Figure 6E:
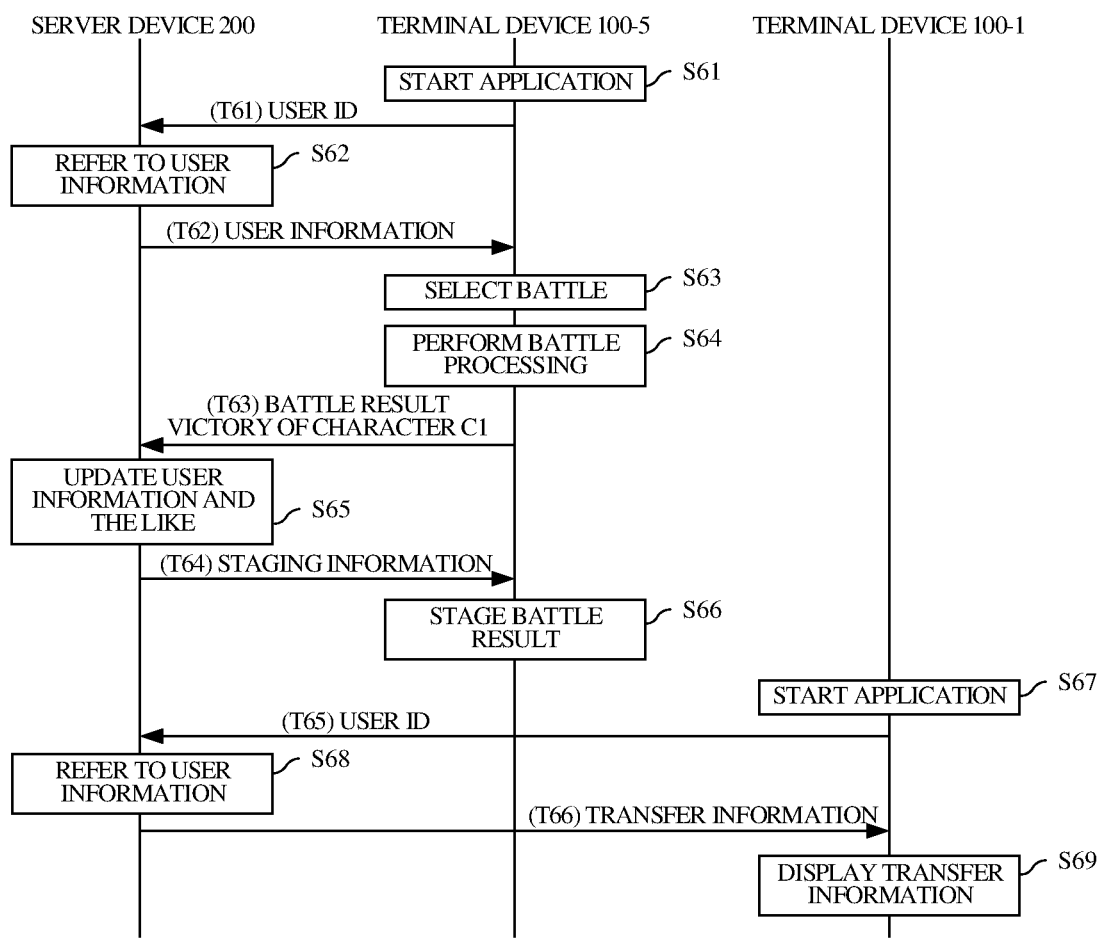
FIG. 6e is a diagram illustrating a processing sequence between the terminal devices 100 and the server device 200 according to the first embodiment of the present disclosure.

FIG. 6e is a diagram illustrating a processing sequence between the terminal devices 100 and the server device 200 according to the first embodiment of the present disclosure. To be specific, FIG. 6e illustrates a processing sequence of a battle performed by the user E of FIG. 1a. That is, the terminal device 100-1 in FIG. 6e illustrates the terminal device held by the user A and the terminal device 100-5 illustrates the terminal device held by the user E.

The processing is started when the application is started in the terminal device 100-5. Processing of S61 to S64 is the same as the processing of S41 to S44 of FIG. 6d, and thus description is omitted.

When the battle processing of S64 is terminated, battle result information is transmitted from the terminal device 100-5 to the server device 200 (T63). Note that, in FIG. 6e, victory of the character C1 is transmitted as the battle result information. When the character C1 wins, the character C1 can be continuously kept transferred to the user who the character C1 has battled against. Therefore, when the server device 200 receives the battle result information indicating the victory of the character C1, the processor 212 of the server device 200 does not select a new destination of the character C1 and does not update the destination information of the character C1 of the user A. Meanwhile, a privilege according to the battle is provided to the user E who has battled, and thus the processor 212 updates the user information table according to the provided privilege (S65).

Further, the processor 212 transmits information indicating the provided privilege to the terminal device 100-5 as staging information (T64). When the terminal device 100-5 receives the staging information, the processor 112 of the terminal device 100-5 displays, on the display 111, battle result staging for notifying the user E of the privilege (S66).

In FIG. 6e, when the user A who is the original user of the character C1 starts the application in the terminal device 100-1 (S67), the current destination of the character C1 is known. However, the processing of S67 to S69 is similar to the processing of S16 to S18 of FIG. 6a, and thus description is omitted.

[Processing of Terminating Transfer in FIG. 1a]

Figure 6F:
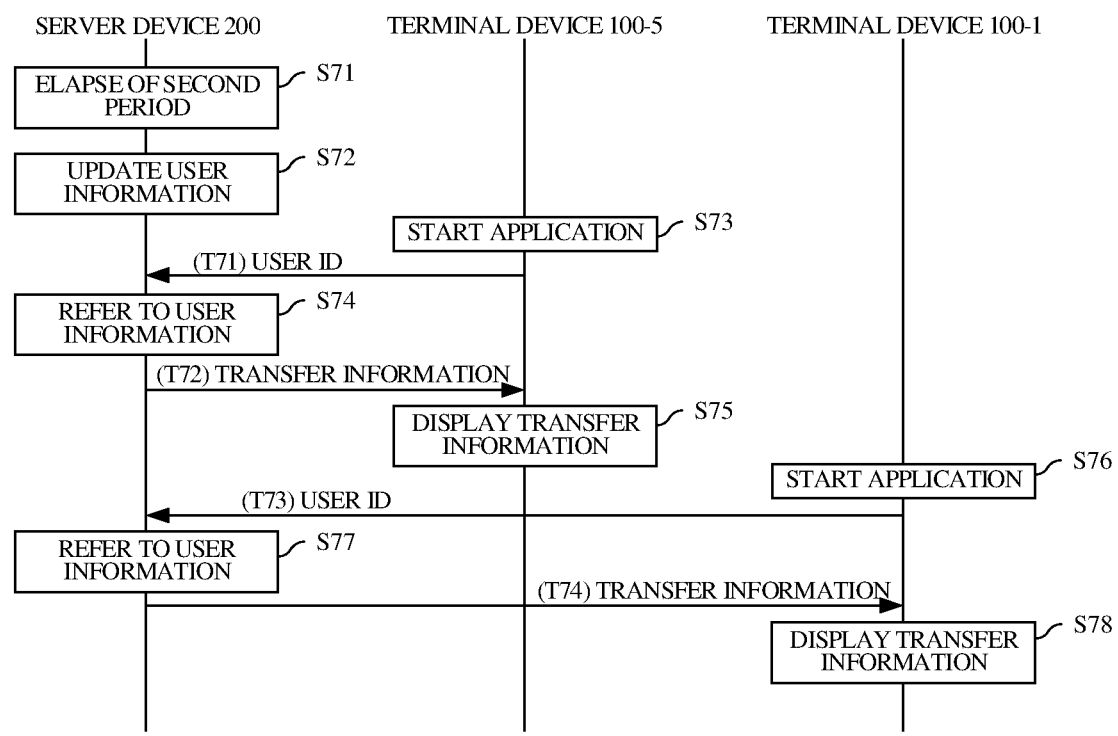
FIG. 6f is a diagram illustrating a processing sequence between the terminal devices 100 and the server device 200 according to the first embodiment of the present disclosure.

FIG. 6f is a diagram illustrating a processing sequence between the terminal devices 100 and the server device 200 according to the first embodiment of the present disclosure. To be specific, FIG. 6f illustrates a processing sequence of when transfer is terminated in FIG. 1a. That is, the terminal device 100-1 in FIG. 6f illustrates the terminal device held by the user A and the terminal device 100-5 illustrates the terminal device held by the user E.

Termination of the transfer is performed to return the character C1 to the original user A when a second period has passed from when the first transfer (transfer 1) is performed. According to FIG. 6f, the processor 212 of the server device 200 periodically refers to the character information table, and checks whether there is a character existing after the elapse of the second period from the first transfer, that is, after the character C1 is first associated with the user ID of another user (S71). Then, when the second period has passed from the first transfer (transfer 1) of the character C1, that is, after the character C1 is first associated with the user ID of another user including the user B, the transfer is terminated. To be specific, the processor 212 deletes the user ID (U5) of the user E from the destination information, the user ID (U5) of the user E having been stored as the destination information of the character C1 (S72). That is, the processor 212 cancels the association between all the users other than the user A who is the original owner of the character C1, and the character C1.

When the users start the application in the terminal devices 100-1 and 100-5, the transfer information is displayed on the basis of the information updated in S72. The processing of S73 to S75 and the processing of S76 to S78 performed at this time are similar to the processing of S16 to S18 of FIG. 6a, and thus description is omitted. Note that, in FIG. 6f, since the processing is processing when the transfer is terminated, information indicating transfer termination is transmitted and displayed as the transfer information. Content displayed at this time will be described below.

FIG. 12a is a diagram conceptually illustrating the user information table stored in the server device 200 according to the first embodiment of the present disclosure. To be specific, FIG. 12a is a diagram illustrating the user information table after the user information is updated in S72 of FIG. 6f. Compared with the character information table of FIG. 5a that stores the user ID U4 as the destination information of the character C1, the user ID of the destination has been deleted from the destination information with the termination of the transfer in FIG. 12a. Therefore, as for the transfer information transmitted in T72 and T74, the destination information is transmitted as "blank".

6. Processing Flow of Terminal Device 100

Figure 7:
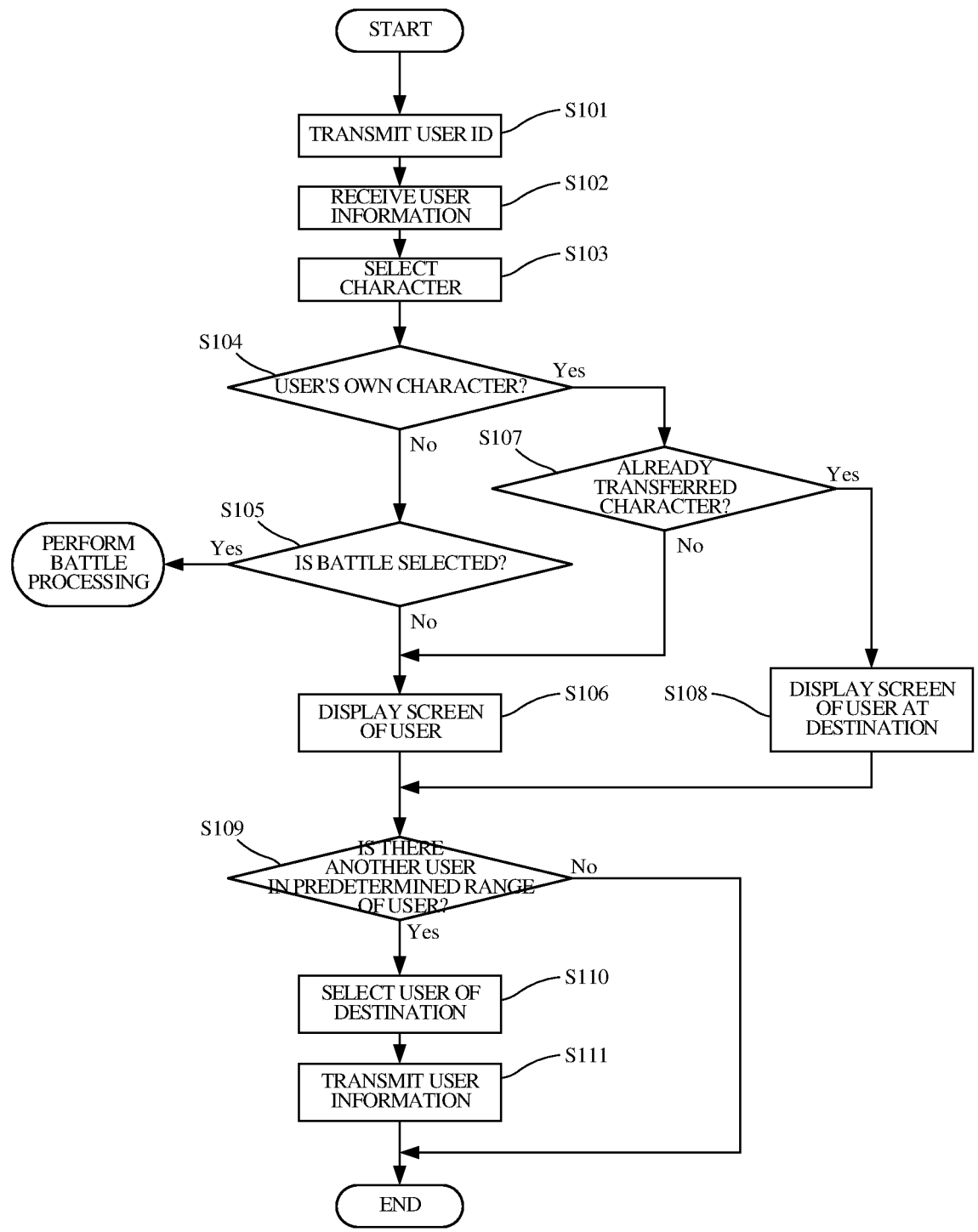
FIG. 7 is a diagram illustrating a processing flow executed in the terminal device 100 according to the first embodiment of the present disclosure.

FIG. 7 is a diagram illustrating a processing flow executed in the terminal device 100 according to the first embodiment of the present disclosure. To be specific, FIG. 7 illustrates a processing flow in which the processor 112 reads an instruction command (program) for execution of the application according to the present embodiment in the terminal device 100 from the memory 119 and executes the program.

Figure 8:
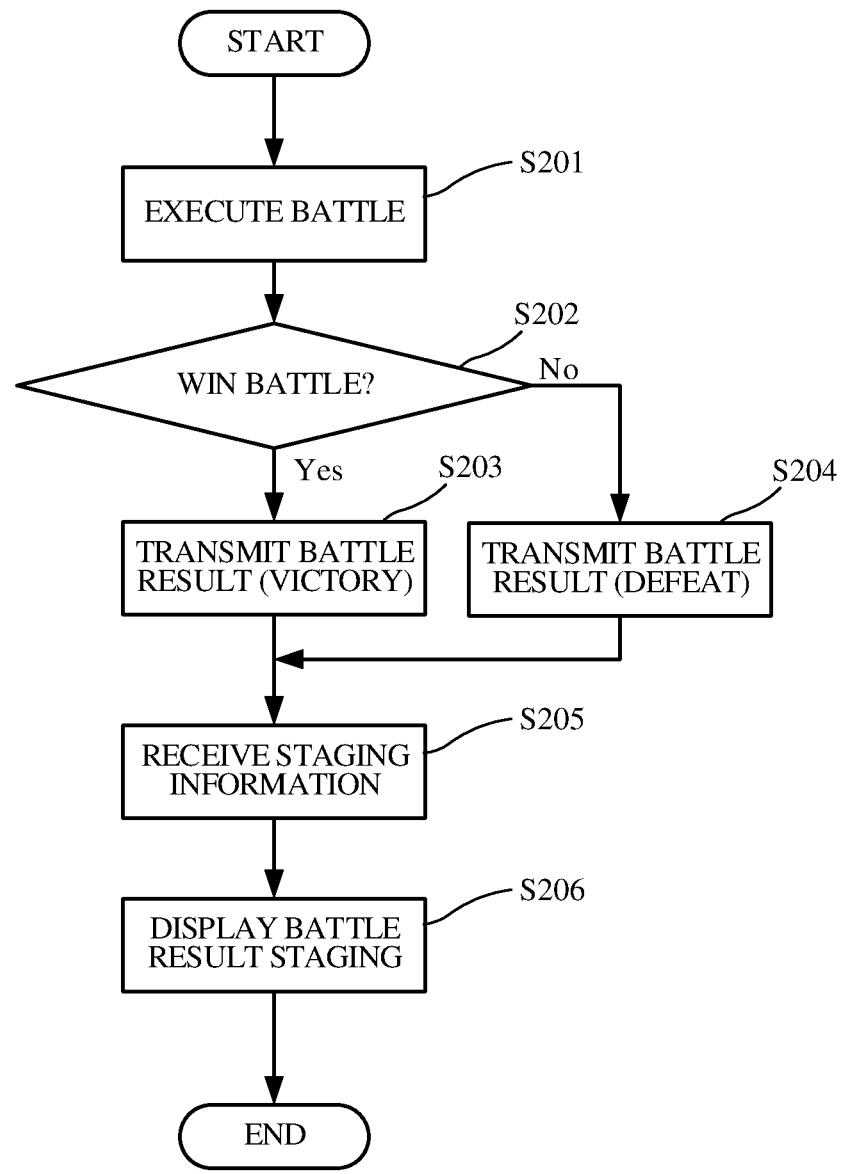
FIG. 8 is a diagram illustrating a processing flow executed in the terminal device 100 according to the first embodiment of the present disclosure.

According to FIG. 7, the processing flow is started when the processor 112 starts the application according to an instruction input from the user and transmits the user ID to the server device 200 (S101). After that, when the processor 112 receives the user information including the transfer information from the server device 200 (S102), the processor 112 displays the map screen exemplarily illustrated in FIG. 11a or the character selection screen exemplarily illustrated in FIG. 11c on the basis of the received user information. The processor 112 then selects the character that the user wishes to transfer according to the instruction input from the user (S103). Next, the processor 112 determines whether the selected character is an own user character, that is, a character stored in the "character ID" of FIG. 5a (S104). When the selected character is not the character, a character transferred from another user has been selected. Therefore, the processor 112 selects whether performing the battle processing between the own character and the selected character (S105) according to an instruction input from the user (FIG. 11b). Here, when the battle is selected, the processor 112 proceeds to the battle processing (FIG. 8). Meanwhile, when the processor 112 determines that the own character has been selected in S104, the processor 112 refers to the "destination" information of FIG. 5a and determines whether the selected character is an already transferred character (S107).

When the battle is not selected in S105, and when the selected character is not the already transferred character in S107, the processor 112 displays the map screen (FIG. 11a) centered around the current own positional information (S106). Meanwhile, when the selected character is the already transferred character in S107, the processor 112 displays the map screen (FIG. 11d) centered around the current positional information of the user at the destination (S108). Next, the processor 112 confirms whether another user exists within a predetermined range from the own user on the own map screen, or whether another user exists within a predetermined range from the user at the destination on the map screen of the user at the destination (S109). Then, when there is no another user, the processor 112 terminates the series of processing without performing the processing of S110 and subsequent processing. Meanwhile, when there is another user, the processor 112 superimposes and displays the position of the user on the map screen, and receives selection of a user that is a destination of the character selected in S103 (S110). The processor 112 then performs control to transmit, to the server device 200, the user ID of the selected user that is the destination, and terminates the series of processing (S111).

FIG. 8 is a diagram illustrating a processing flow executed in the terminal device 100 according to the first embodiment of the present disclosure. To be specific, FIG. 8 illustrates a battle processing flow in which the processor 112 reads an instruction command (program) for execution of the application according to the present embodiment in the terminal device 100 from the memory 119 and executes the program.

The processing flow is started when the battle is selected in S105 of FIG. 7. First, when the battle is selected, selection of battle conditions and the like is performed, and a battle game is executed (S201). Note that detailed description of processing during the battle game is omitted. As a result of execution of the battle game, when the character of the user wins (the transferred character is defeated) (S202), the processor 112 performs control to transmit information indicating victory (defeat of the transferred character) to the server device 200 as the battle result information (S203). On the other hand, when the character of the user is defeated (the transferred character wins), the processor 112 performs control to transmit information indicating defeat (victory of the transferred character) to the server device 200 as the battle result information (S204). Then, the server device 200 selects a privilege according to the transmitted battle result information, and the processor 112 performs control to receive the staging information including privilege information (S205). Next, the processor 112 performs staging display of the battle result on the display 111 on the basis of the received staging information and terminates the series of processing (S206).

7. Processing Flow of Server Device 200

Figure 9:
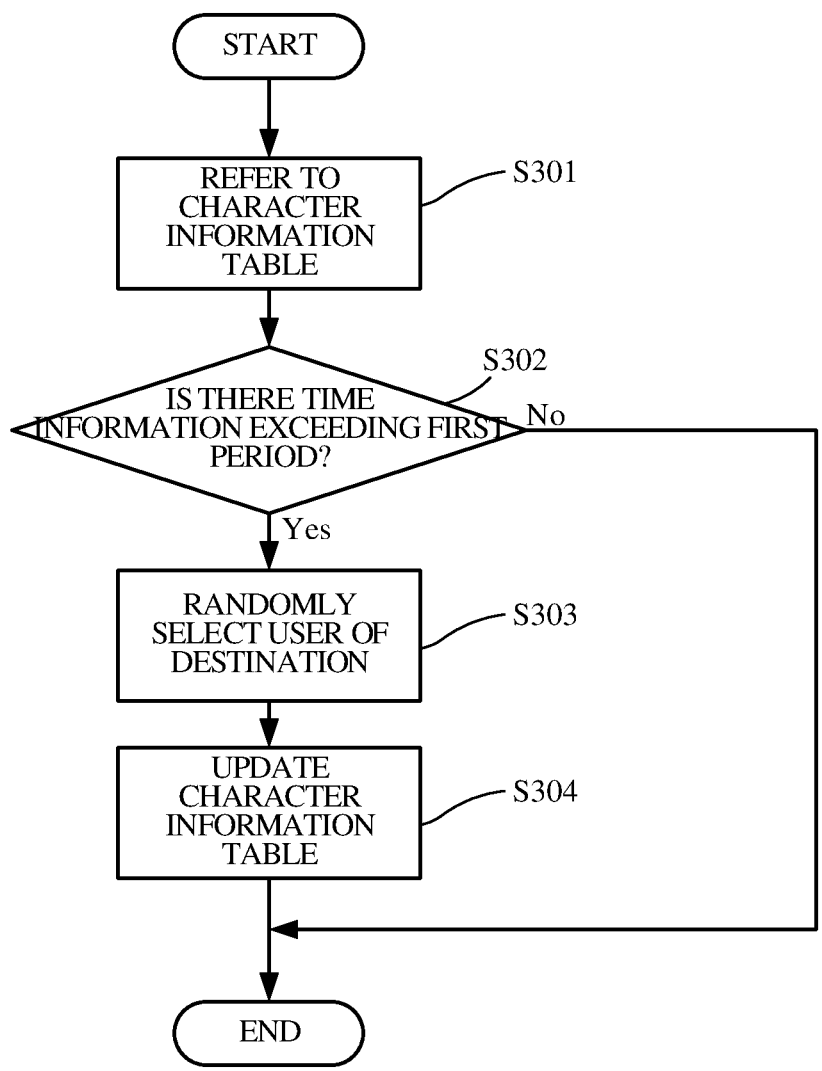
FIG. 9 is a diagram illustrating a processing flow executed in the server device 200 according to the first embodiment of the present disclosure.

FIG. 9 is a diagram illustrating a processing flow executed in the server device 200 according to the first embodiment of the present disclosure. To be specific, FIG. 9 illustrates a processing flow in which the processor 212 reads an instruction command (program) for execution of the application according to the present embodiment from the memory 211 and executes the program.

The processing flow in FIG. 9 illustrates a processing flow executed in the transfer 2 of FIG. 1a and FIG. 6b. The processing flow is executed by the processor 212 with a predetermined period. The processing flow is started by the processor 212 first referring to the character information table stored in the memory 211 (S301). Next, the processor 212 refers to the "time information" in the character information table, and confirms whether there is time information that has exceeded the first period determined in advance in the time information (S302). When there is no time information having exceeded the first period, the processor 212 terminates the processing flow. Meanwhile, when there is the time information having exceeded the first period, the processor 212 identifies the character associated with the time information, and selects a new destination of the character (S303). Then, the processor 212 performs control to reset the time information of the character, in addition to update of the user character associated with the character, and terminates the series of processing (S304).

Figure 10:
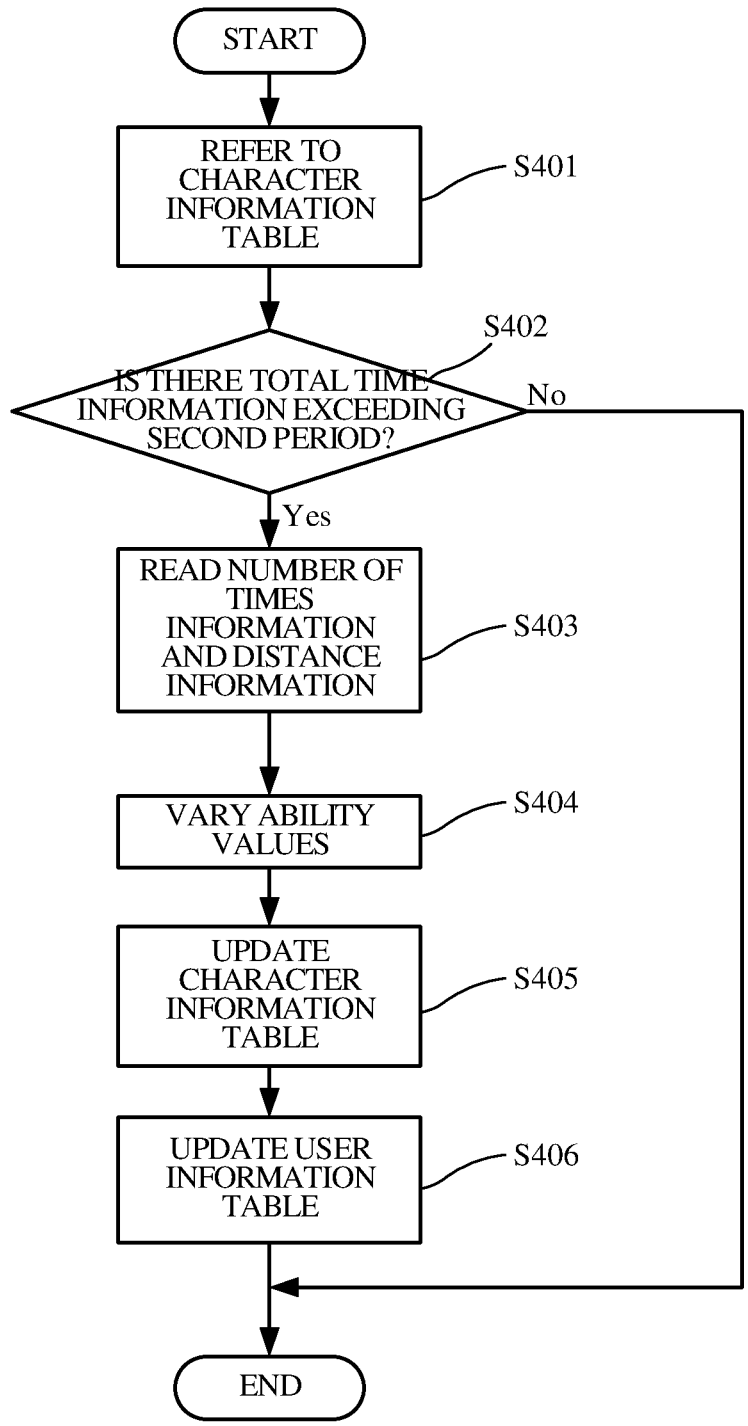
FIG. 10 is a diagram illustrating a processing flow executed in the server device 200 according to the first embodiment of the present disclosure.

FIG. 10 is a diagram illustrating a processing flow executed in the server device 200 according to the first embodiment of the present disclosure. To be specific, FIG. 10 illustrates a processing flow in which the processor 212 reads an instruction command (program) for execution of the application according to the present embodiment from the memory 211 and executes the program.

The processing flow in FIG. 10 illustrates a processing flow executed in termination of the transfer of FIG. 1a and FIG. 6f. The processing flow is executed by the processor 212 with a predetermined period. The processing flow is started by the processor 212 first referring to the character information table stored in the memory 211 (S401). Next, the processor 212 refers to the "total time information" in the character information table, and confirms whether there is total time information that has exceeded the second period determined in advance in the total time information (S402). When there is no total time information having exceeded the second period, the processor 212 terminates the processing flow. Meanwhile, when there is the total time information having exceeded the second period, the processor 212 identifies the character associated with the total time information, and reads the "number of time information" and the "distance information" of the character (S403).

The "number of times information" indicates the number of times of transfer of the character to other users. Further, the "distance information" indicates, in a case where the character is sequentially transferred to a plurality of users and terminates the transfer, a sum of the distance moved by the users at the destination while the character is kept transferred. In the present embodiment, the ability values of the transferred character are varied according to the number of time information and the distance information (S404). As an example, the ability values of the transferred character are further increased as the number of the transfer times is larger. Further, the ability values of the characters are further increased, the character having been transferred and moved by a larger distance. The processor 212 updates the ability values in the character information table on the basis of the varied ability values (S405).

In the example of FIG. 1a, the character C1 has performed four times of transfer including the transfer 1, the transfer 2, the transfer 3, and the transfer 4. Further, during the transfer, the character C1 has performed movement 1 with the user B, movement 2 with the user C, and movement 3 with the user E, and has been moved by 640 km in total. Therefore, the processor 212 varies the ability values of the character according to the arithmetic expressions below prepared in advance, as an example.

The offensive power=the offensive power before transfer×the number of times

The defensive power=the defensive power before transfer×the number of times

The recovery power=the recovery power before transfer+the distance/the number of times The hit point=the hit point before transfer+the distance×0.5

Note that the above arithmetic expressions are examples, and the ability values may be increased or decreased according to the moving distance and/or the number of transfer times.

FIG. 12b is a diagram conceptually illustrating the character information table stored in the server device 200 according to the first embodiment of the present disclosure. To be specific, FIG. 12b illustrates the character information table after updated by the processing in FIG. 10. Referring to FIG. 12b, the ability values are updated and stored on the basis of the four times of transfer of the character C1 and the total distance (640 km) moved together with the users at the destination. Further, the number of times information, the time information, the total time information, and the distance information are reset with the termination of the transfer.

Referring back to FIG. 10, when the character information table is updated, the processor 212 updates the user information table (S406). Here, the transfer of the character is terminated with the elapse of the second period. Therefore, the processor 212 resets the destination information in the user information table and terminates the series of processing.

Figure 11F:
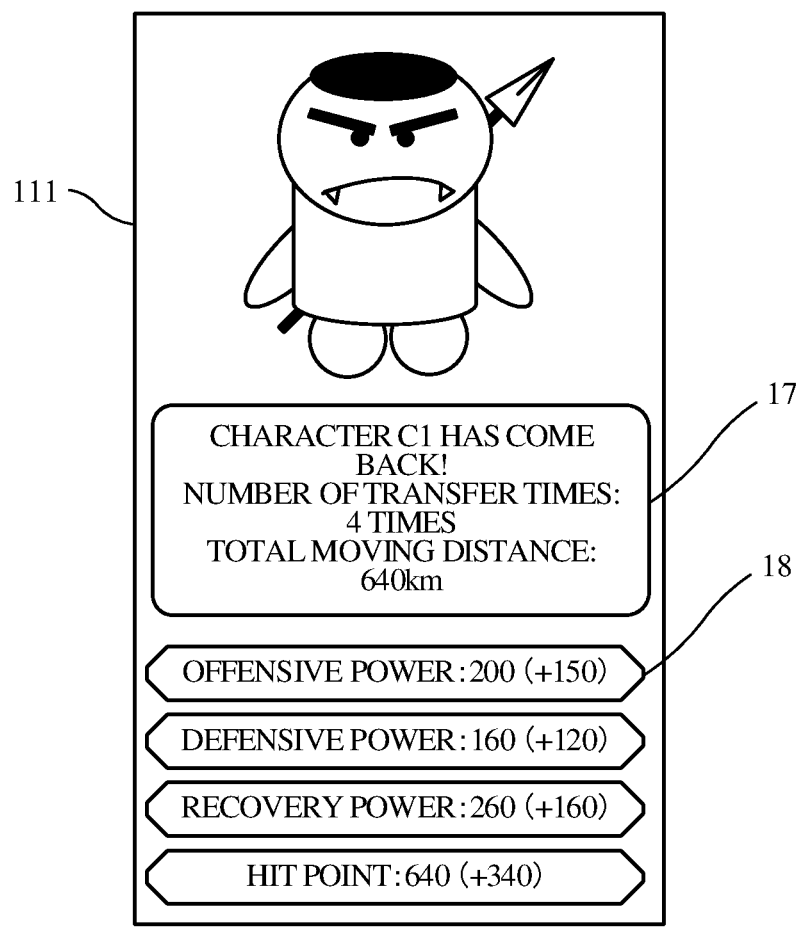
FIG. 11f is a diagram illustrating an example of a screen displayed on the display 111 of the terminal device 100 according to the first embodiment of the present disclosure.

FIG. 11f is a diagram illustrating an example of the screen displayed on the display 111 of the terminal device 100 according to the first embodiment of the present disclosure. To be specific, FIG. 11f illustrates an example of the screen displayed on the basis of the user information including the transfer information transmitted to the terminal device 100-1 of the user A after the processing flow in FIG. 10 is executed. Referring to FIG. 11f, the entire image of the character C1 that is the character of the user A, and a display 17 indicating that the transfer has been terminated are displayed. The display includes the information of the number of transfer times and the total moving distance. Further, as the ability value information of the character C1, the ability values after variation and their increased amounts are also displayed together.

As described above, in the present embodiment, the virtual character of the user can repeat transfer to other users upon a certain trigger. Further, the ability values of the character can be varied at the destination according to the distance moved together with the users to which the character has been transferred. That is, from the viewpoint of the user at the starting point, the user's own virtual character is brought to go on a so-called "journey" with another user, and the character C1 can be strengthened according to the distance of the "journey". Therefore, according to the present embodiment, a server device, a program, and a method for executing a new and highly enjoyable application using a predetermined item and a parameter value of the item can be provided.

Second Embodiment

In the first embodiment, a case in which transfer is terminated according to elapse of the second period has been described. In a second embodiment, a case in which transfer is terminated according to a result of a battle will be described. Note that the present embodiment has similar configurations, processing, and procedures to the first embodiment except the points specifically described below. Therefore, detailed description of the similar matters is omitted.

Figure 13:
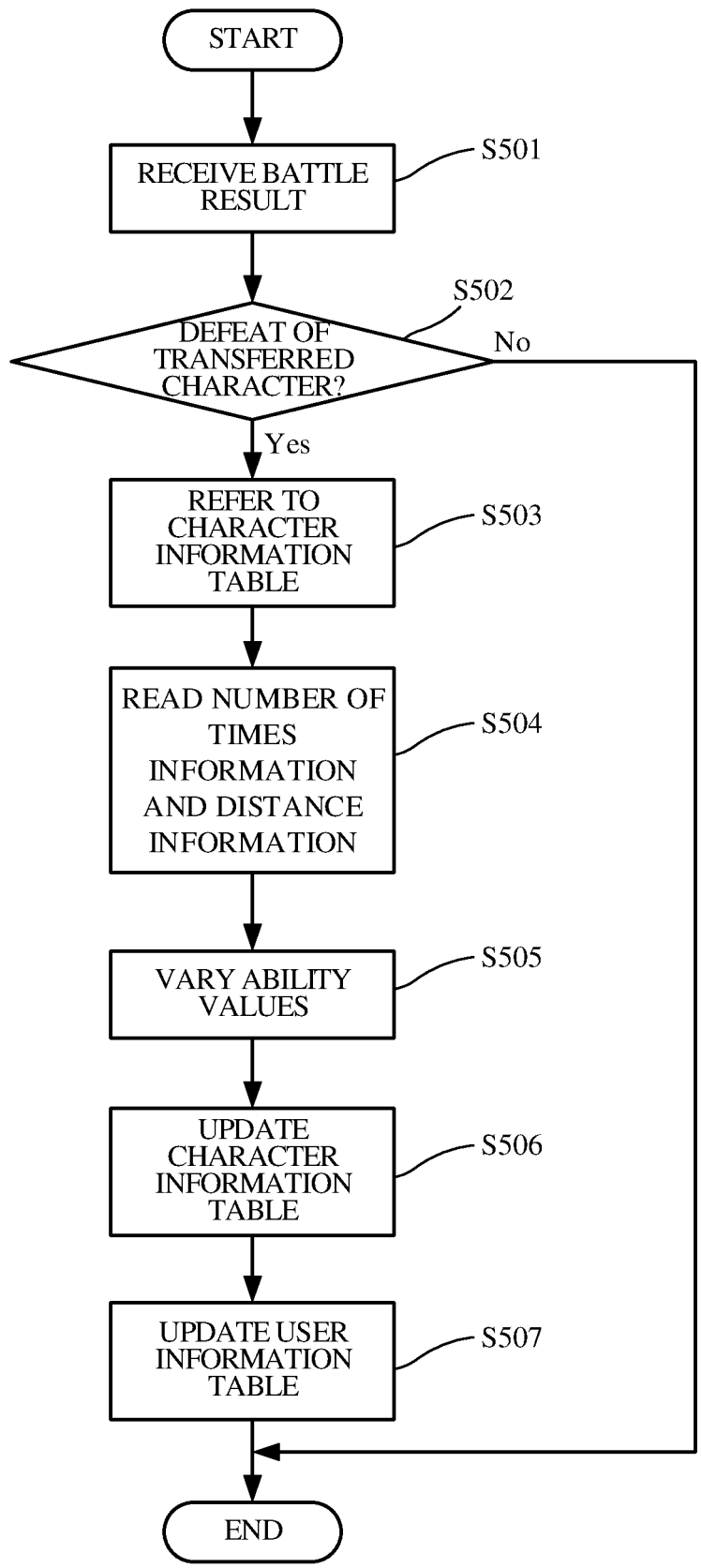
FIG. 13 is a diagram illustrating a processing flow executed in a server device 200 according to a second embodiment of the present disclosure.

FIG. 13 is a diagram illustrating a processing flow executed in a server device 200 according to the second embodiment of the present disclosure. To be specific, FIG. 13 illustrates a processing flow in which a processor 212 reads an instruction command (program) for execution of an application according to the present embodiment from a memory 211 and executes the program.

The processing flow of FIG. 13 is started when the server device 200 receives battle result information indicated in FIG. 8 from a terminal device 100 (S501). When the battle result information is received, the processor 212 performs processing of S503 and subsequent processing and terminates transfer without making transfer to another user when the battle result information indicates defeat of a transferred character (S502). To be specific, the processor 212 refers to a character information table of the defeated character (S503), and reads "number of times information" and "distance information" of the character (S504). Note that subsequent processing is similar to the processing of S403 to S406 of FIG. 10, and thus description is omitted.

As described above, according to the second embodiment, termination of transfer can be determined by a battle, in addition to similar effects to the first embodiment. Therefore, enhanced enjoyment can be provided to the user.

Other Embodiments

In the first and second embodiments, a case of executing a game application capable of executing battle games has been described. However, the invention of the present disclosure can be favorably applied to various applications such as an SNS application and a browser application, in addition to the game application.

Further, in the first and second embodiments, the "character" has been exemplarily described as the "item". However, the item is not limited to the "character" item. For example, the invention of the present disclosure can be favorably applied to equipment items of characters displayed in the game application and the SNS application, various advertisement content, paid video content, and the like.

As an example, by application of the invention of the present disclosure, a system using an SNS application, in which paid video content is transferred (propagated) from user to user as an item, and the purchase price of the paid video content that is one of parameter values is discounted according to the number of transfer times or distance, can be performed.

Further, in the first and second embodiments, the transfer 2 to the transfer 4 of FIG. 1a have been described in order. However, it is not necessary to perform the transfer in that order. Further, each transfer may be performed a plurality of times or may not be performed.

Further, in the first and second embodiments, a variation amount of a parameter value of an item has been calculated on the basis of the "distance information" calculated on the basis of the "positional information". However, an embodiment is not limited to the case, and the variation amount may be calculated on the basis of only the current "positional information" of the user to which the character has been transferred. For example, an example can be considered, in which the hit point is doubled when the character is at a point A, the hit point is tripled when the character is at a point B, and the hit point is halved when the character is at a point C.

The elements described in the embodiments can be appropriately combined or the elements can be replaced to configure a system.

The processing and the procedures described in the present specification are not limited to the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a non-volatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The server device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A server device comprising:
a communication interface configured to receive positional information from a plurality of terminal devices with respect to a plurality of users located in a real world, the plurality of users operating the plurality of terminal devices including first and second terminal devices, the plurality of users including first and second users, the first and second users operating the first and second terminal devices, respectively;
a memory configured to store one or more of a plurality of items and parameter values of the plurality of items in association with user identification information of each of the plurality of users, the memory being configured to store computer-readable instructions, the plurality of items including first and second items, the user identification information including first and second user identification information for the first and second users, the first and second items corresponding to the first and second users, respectively; and
a processor configured to execute the computer-readable instructions so as to:
assign the first item to the second user identification information of the second user switched from the first user while the processor maintains correspondence between the first item and the first user;
receive first current location information as the positional information from the second terminal device in the real world;
receive second current location information as the positional information from the second terminal device in the real world after a predetermined period of time passes from the reception of the first current location information;
obtain a moving distance of the second terminal device in the real world based on the first current location information and the second current location information; and
vary the parameter value of the first item in accordance with the moving distance.

2. The server device according to claim 1,
wherein the processor is configured to receive first and second initial location information from the first and second terminal devices in the real world, respectively, so as to obtain an initial distance between the first and second terminal devices, and
wherein when the initial distance is within a predetermined range, the processor is configured to assign the first item to the second user identification information of the second user.

3. The server device according to claim 1,
wherein the processor is configured to receive initial location information from the puerility of terminal devices so as to obtain initial distances between any two of the plurality of terminal devices, and
wherein the initial distance between the first and second terminal devices is within a predetermined range, the second user is selected among the plurality of users according to an instruction input by the first user.

4. The server device according to claim 1,
wherein the processor is configured to receive initial location information from the plurality of terminal devices so as to obtain initial distances between any two of the plurality of terminal devices, and
wherein when the initial distances between the first terminal device and the plurality of terminal devices including the second terminal device is within a predetermined range, the second user is randomly selected.

5. The server device according to claim 1,
wherein the user identification information includes third user identification information corresponding to a third user of the plurality of users, and
the processor is configured to assign the first item to the third user identification information of the third user switched from the second user while the processor maintains correspondence between the first item and the first user when a first period passes after the processor assigns the first item to the second user identification information.

6. The server device according to claim 1,
wherein the processor cancels the assignment of the first item to the user identification information except the first user identification information when a second period passes after the processor assigns the first item to the user identification information of other users of the plurality of users including the second user at the first time.

7. The server device according to claim 1,
wherein the user identification information includes third user identification information corresponding to a third user of the plurality of users, and the third user operating a third terminal device of the plurality of terminal devices, and
the processor is configured to assign the first item to the third user identification information of the third user switched from the second user according to an instruction input from the first user while the processor maintains correspondence between the first item and the first user.

8. The server device according to claim 7,
wherein the processor is configured to receive initial location information from the third terminal device in the real world so as to obtain a distance between the initial location information and one of the first and second current location information, and
wherein when the distance is within a predetermined range, the processor is configured to assign the first item to the third user identification information of the third user.

9. The server device according to claim 1,
wherein the first item is a first character operable by an instruction input by each of the plurality of users, and
the parameter value of the first item is an ability value of the first character.

10. The server device according to claim 9,
wherein the user identification information includes third user identification information corresponding to a third user of the plurality of users, and
the processor is configured to assign the first character to the third user identification information of the third user switched from the second user according to a battle result between the first character and a second character corresponding to the second user identification information of the second user.

11. The server device according to claim 10,
wherein the battle result is defeat of the first character by the second character.

12. The server device according to claim 10,
wherein the processor maintains the assignment of the first character to the second user identification information when the battle result is victory of the first character.

13. A computer program product embodying computer-readable instructions stored on a non-transitory computer readable medium for causing a computer to execute a process by a processor, the computer comprising:
- a communication interface configured to receive positional information from a plurality of terminal dives with respect to a plurality of users located in a real world, the plurality of users operating the plurality of terminal devices including first and second terminal devices, the plurality of users including first and second users, the first and second users operating the first and second terminal devices, respectively; and
- a memory configured to store one or more of a plurality of items and parameter values of the plurality of items in association with user identification information of each of the plurality of users, the plurality of items including first and second items, the user identification information including first and second user identification information for the first and second users, the first and second items corresponding to the first and second users, respectively, the computer configured to perform the steps of:
assigning the first item to the second user identification information of the second user switched from the first user while the processor maintains correspondence between the first item and the first user;
- receive first current location information as the positional information from the second terminal device in the real world;
- receive second current location information as the positional information from the second terminal device in the real world after a predetermined period of time passes from the reception of the first current location information;
- obtaining a moving distance of the second terminal device in the real world based on the first current location information and the second current location information; and
- vary the parameter value of the first item in accordance with the moving distance.

14. A method for causing a processor in a computer to execute computer-readable instructions stored in a memory, the method comprising executing the computer-readable instructions on the processor the steps of:
- receiving positional information from a plurality of terminal divces with respect to a plurality of users located in a real world, the plurality of users operating the plurality of terminal devices inducing first and second terminal devices, the plurality of users including first and second users, the first and second users operating the first and second terminal devices, respectively;
- storing one or more of a plurality of items and parameter values of the plurality of items in association with user identification information of each of a plurality of users in the memory, the plurality of items including first and second items, the user identification information including first and second user identification information for the first and second users, the first and second items corresponding to the first and second users, respectively;
- assigning the first item to the second user identification information of the second user switched from the first user while the processor maintains correspondence between the first item and the first user;
- receiving first current location information as the positional information from the second terminal device in the real world;
- receiving second current location information as the positional information from the second terminal device in the real world after a predetermined period of time passes from the reception of the first current location information;
- obtaining a moving distance of the second terminal device in the real world based on the first current location information and the second current location information; and
- varying the parameter value of the first item in accordance with the moving distance.

* * * * *